(12) United States Patent
Toda et al.

(10) Patent No.: US 8,033,465 B2
(45) Date of Patent: Oct. 11, 2011

(54) APPARATUS FOR SEARCHING RFID TAG

(75) Inventors: Katsumi Toda, Toyota (JP); Kunihiro Yasui, Nagoya (JP); Michihiro Takeda, Kiyosu (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 218 days.

(21) Appl. No.: 12/322,645

(22) Filed: Feb. 4, 2009

(65) Prior Publication Data

US 2009/0224045 A1    Sep. 10, 2009

(30) Foreign Application Priority Data

Feb. 6, 2008 (JP) ................................ 2008-026068

(51) Int. Cl.
*G06K 7/00* (2006.01)

(52) U.S. Cl. ...................................................... 235/439

(58) Field of Classification Search ................... 235/439
See application file for complete search history.

(56) References Cited

U.S. PATENT DOCUMENTS

| | | | |
|---|---|---|---|
| 5,281,957 A * | 1/1994 | Schoolman | 345/8 |
| 6,094,625 A * | 7/2000 | Ralston | 702/150 |
| 2004/0182925 A1 * | 9/2004 | Anderson et al. | 235/385 |
| 2007/0001854 A1 * | 1/2007 | Chung et al. | 340/572.1 |
| 2009/0231142 A1 * | 9/2009 | Nikitin et al. | 340/572.8 |
| 2010/0097221 A1 * | 4/2010 | Kreiner et al. | 340/572.1 |

FOREIGN PATENT DOCUMENTS

| | | |
|---|---|---|
| JP | 2003242158 | 8/2003 |
| JP | 2004099278 | 4/2004 |

* cited by examiner

*Primary Examiner* — Daniel Hess
*Assistant Examiner* — David Tardif
(74) *Attorney, Agent, or Firm* — Day Pitney LLP

(57) ABSTRACT

The apparatus has an antenna provided with a predetermined directivity for carrying out radio communication with a RFID tag provided at a search target, a transparent display device that can impart a field of view including a natural image of the search target to vision of an operator and is held by the face of the operator, and a control circuit configured to get communication region information corresponding to a communication region generated along the directivity from the antenna, to generate a display signal for visualization display of the communication region in the field of view of the display device on the basis of the gotten communication region information and to output the signal to the display device.

4 Claims, 20 Drawing Sheets

[FIG. 1]
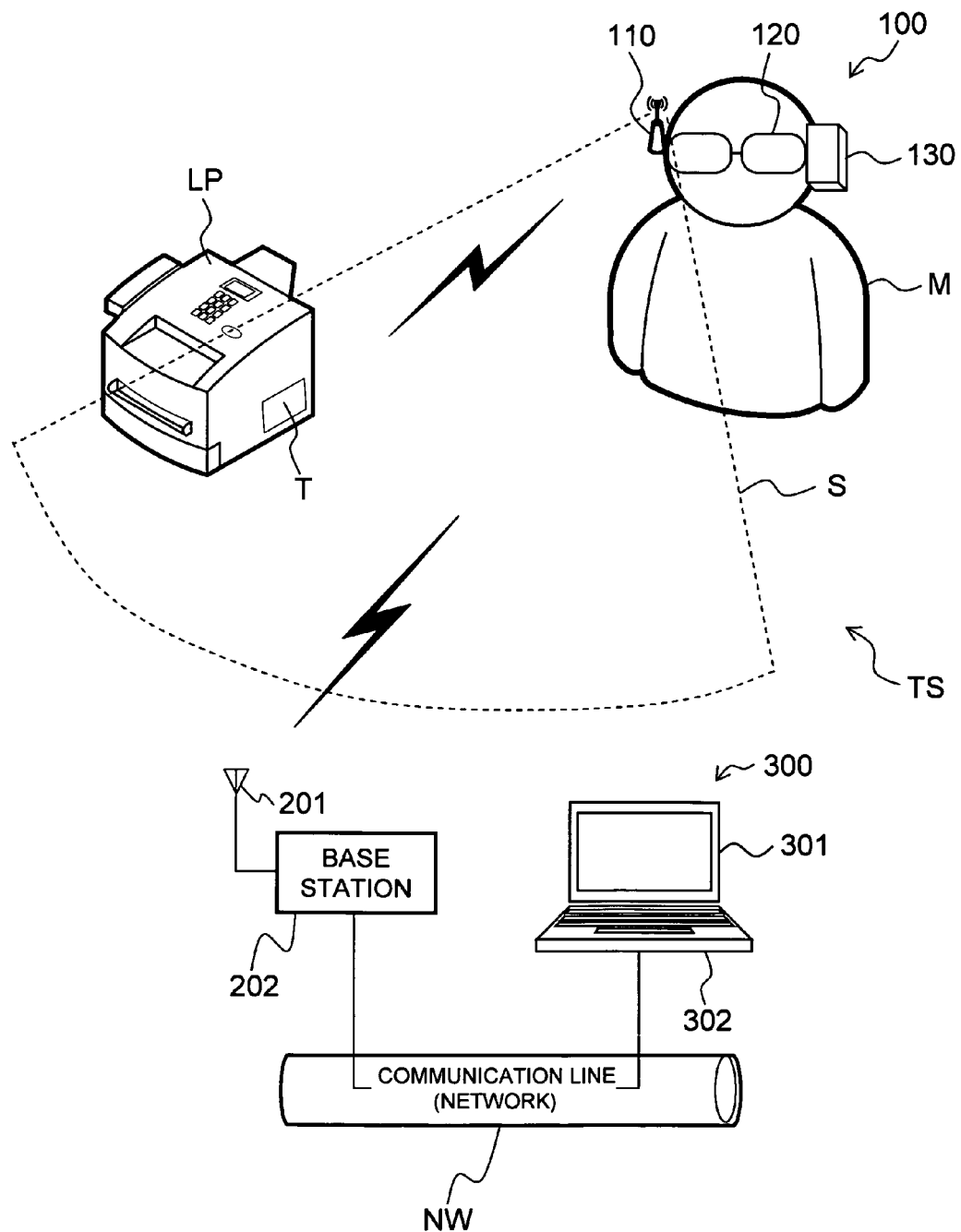

[FIG. 2]
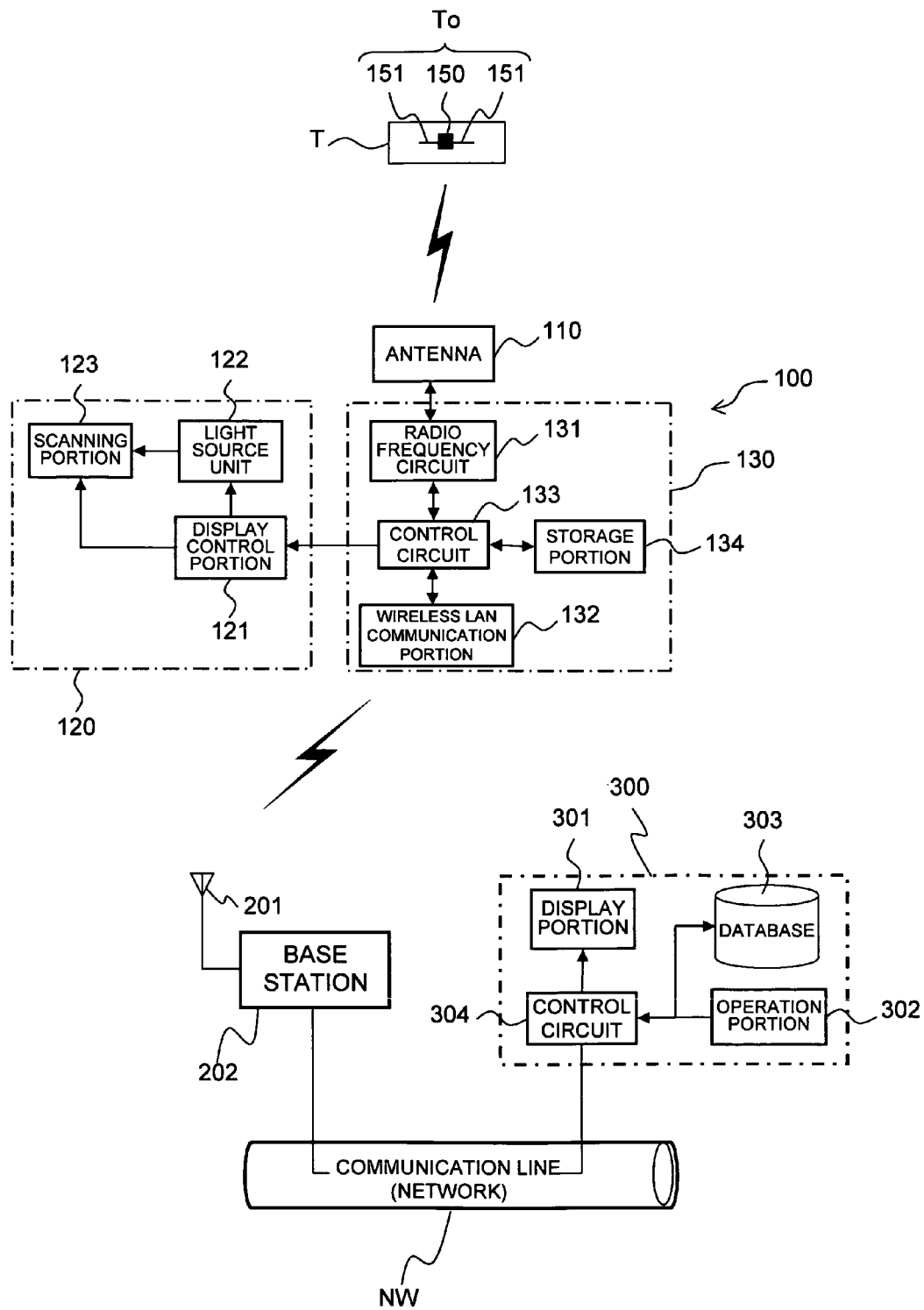

[FIG. 3]
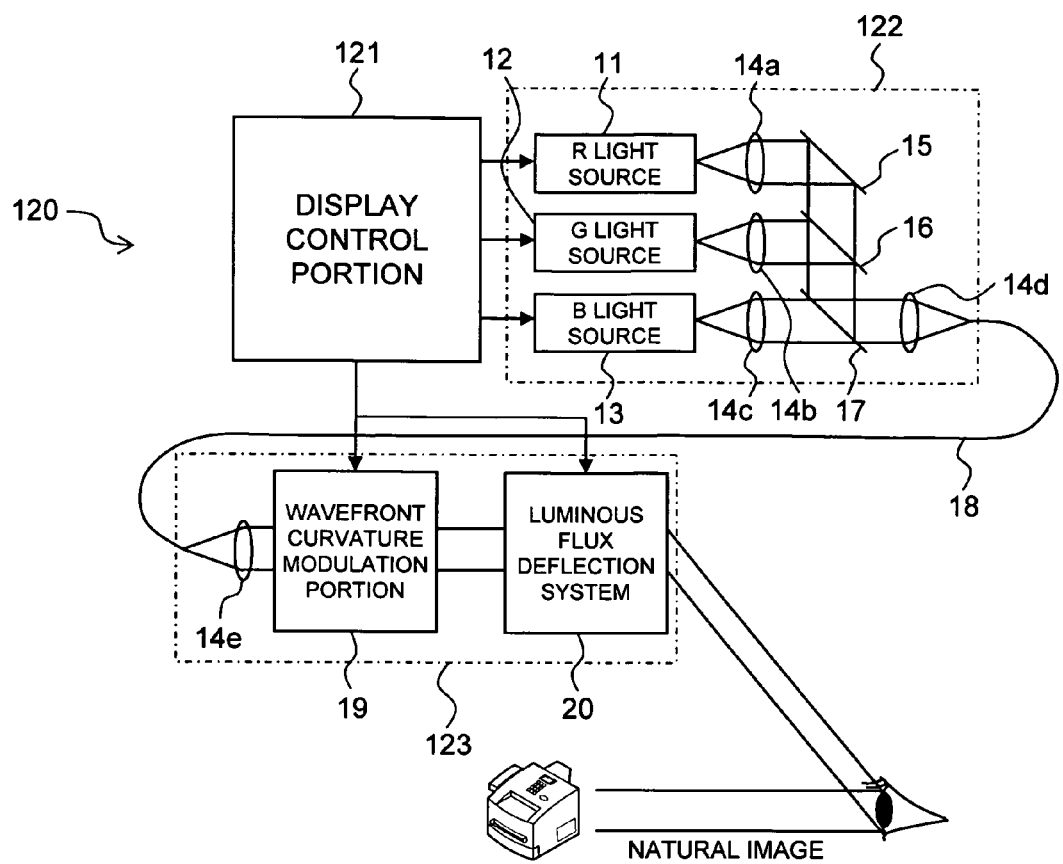

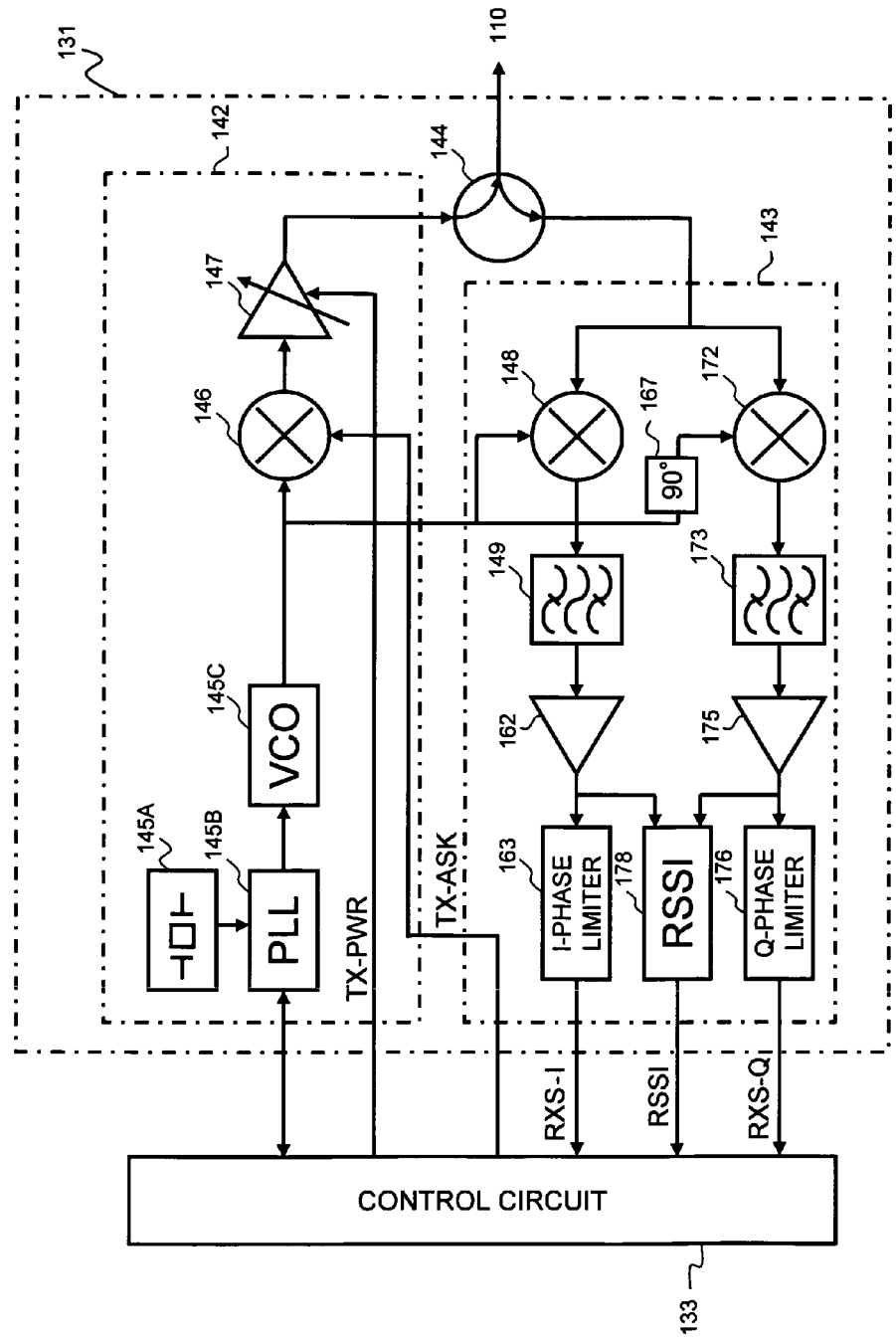
[FIG. 4]

[FIG. 5]
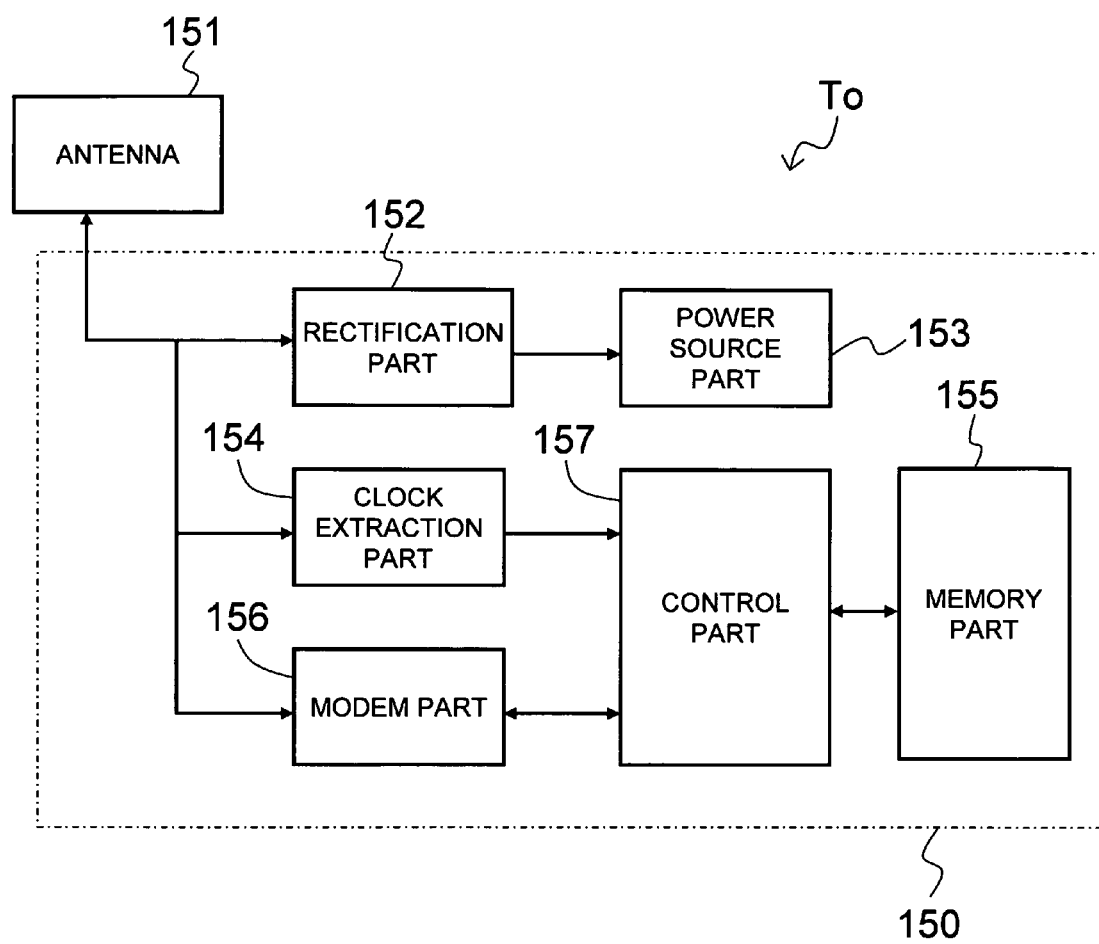

[FIG. 6]
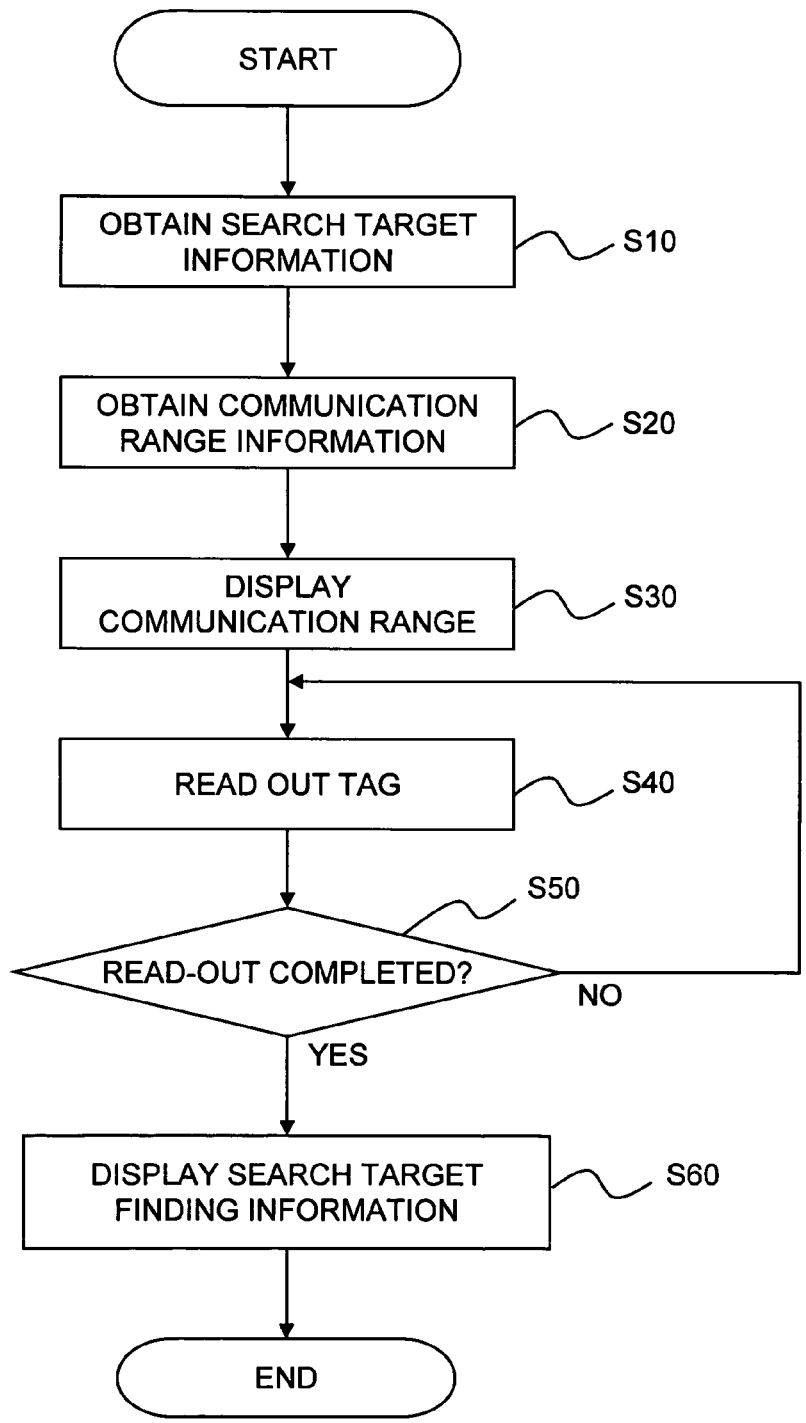

[FIG. 7A]
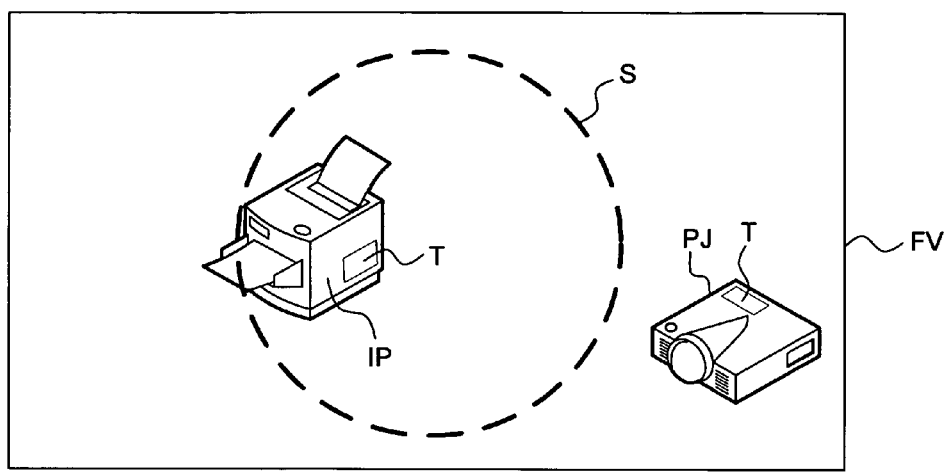
[FIG. 7B]
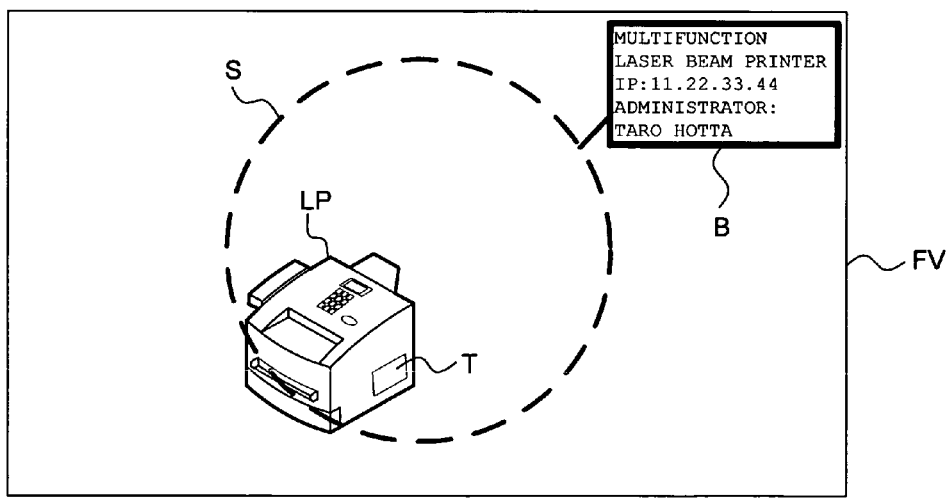

[FIG. 8]
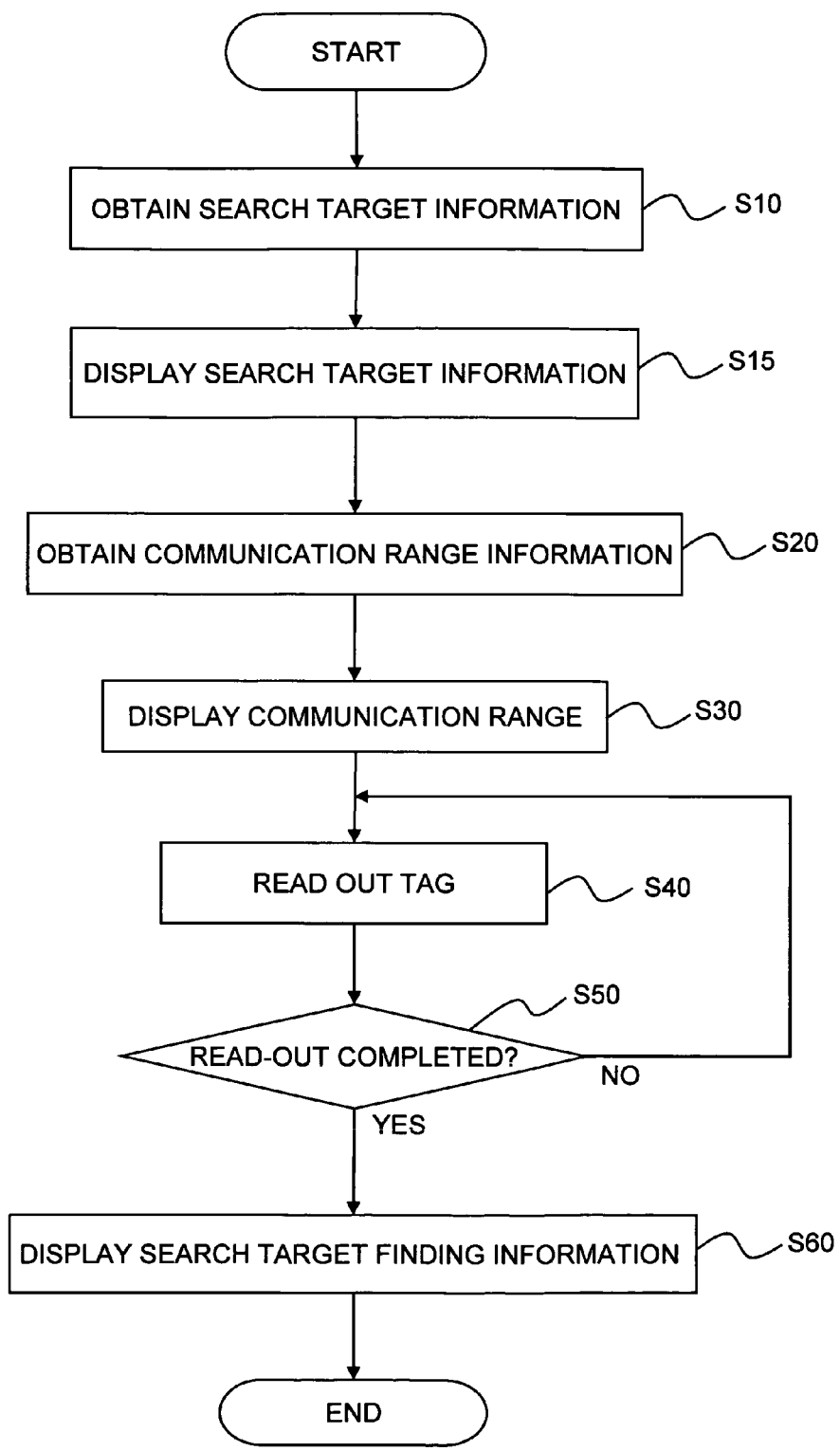

[FIG. 9A]
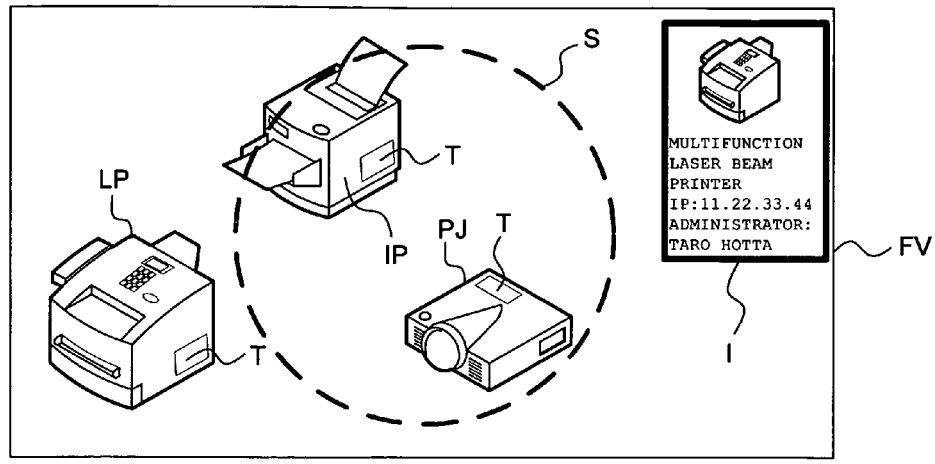
[FIG. 9B]
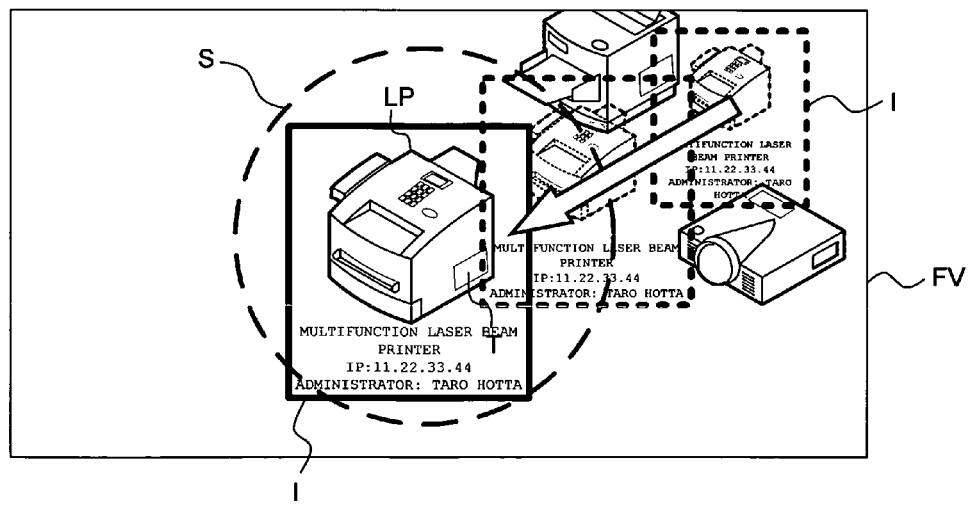

[FIG. 10]
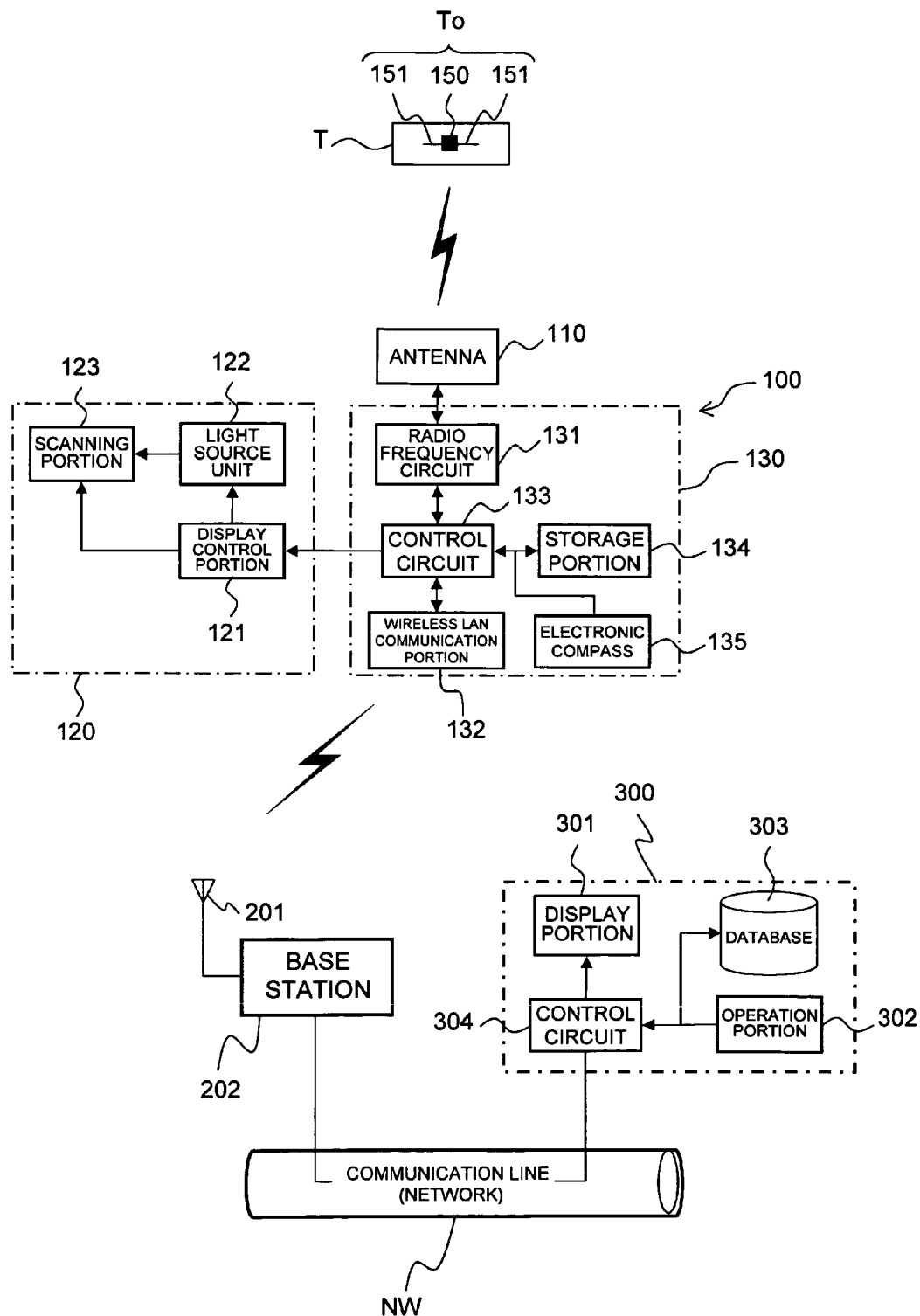

[FIG. 11]
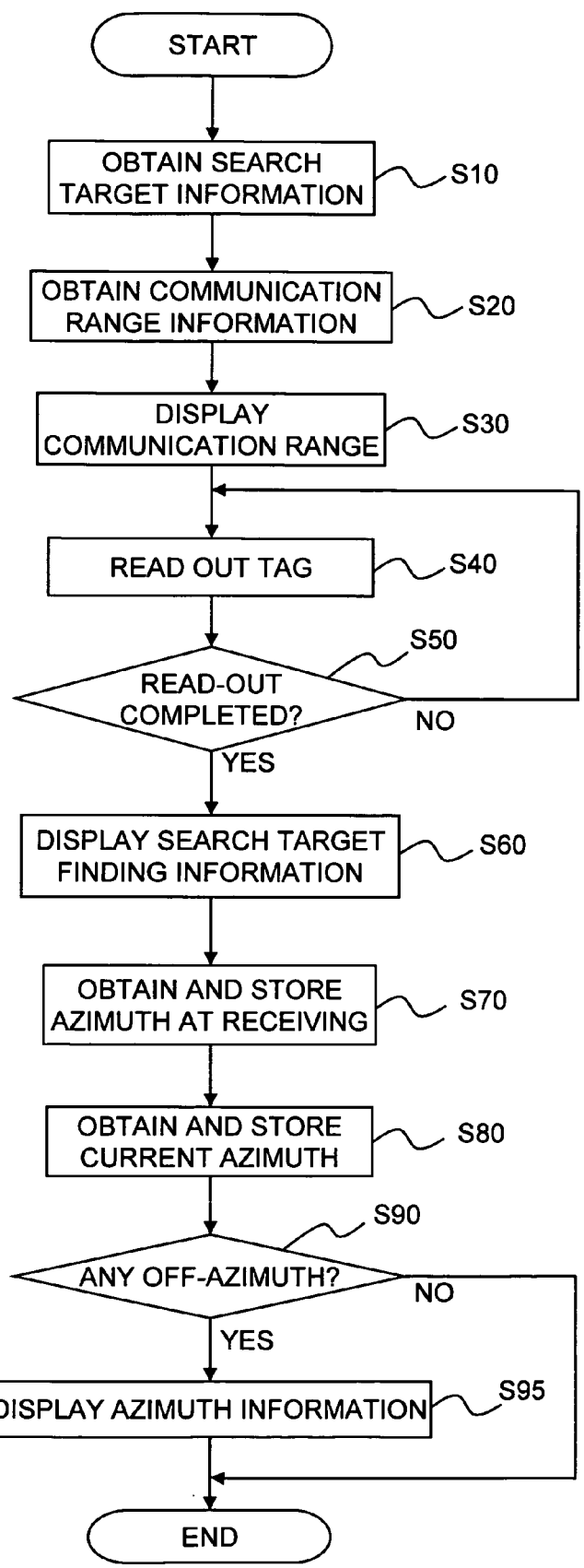

[FIG. 12A]
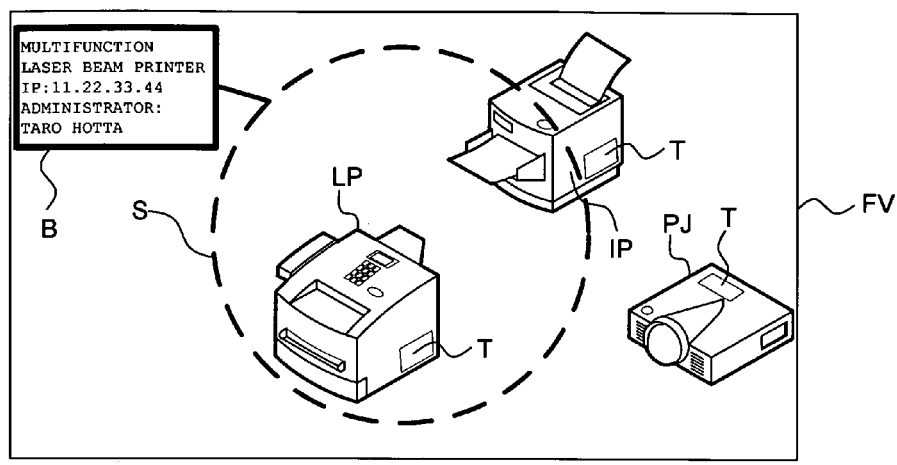
[FIG. 12B]
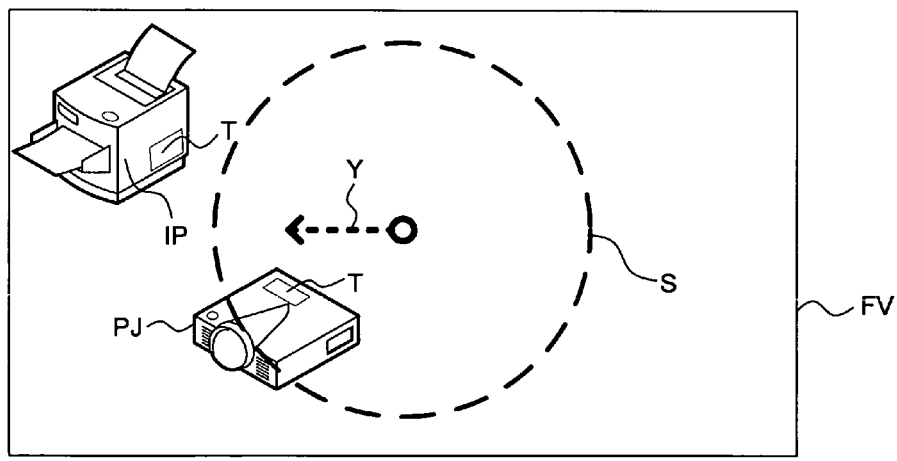

[FIG. 13]
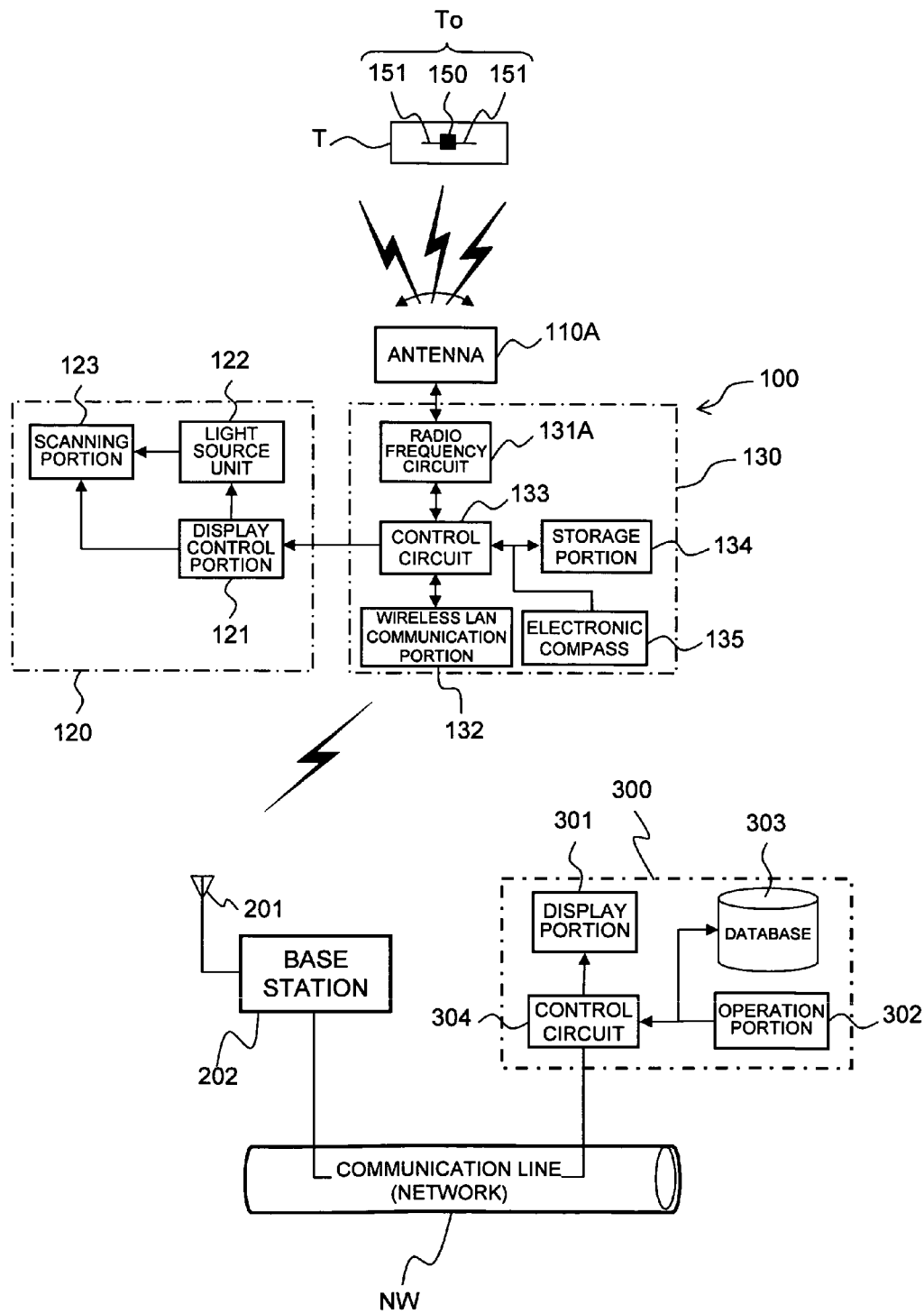

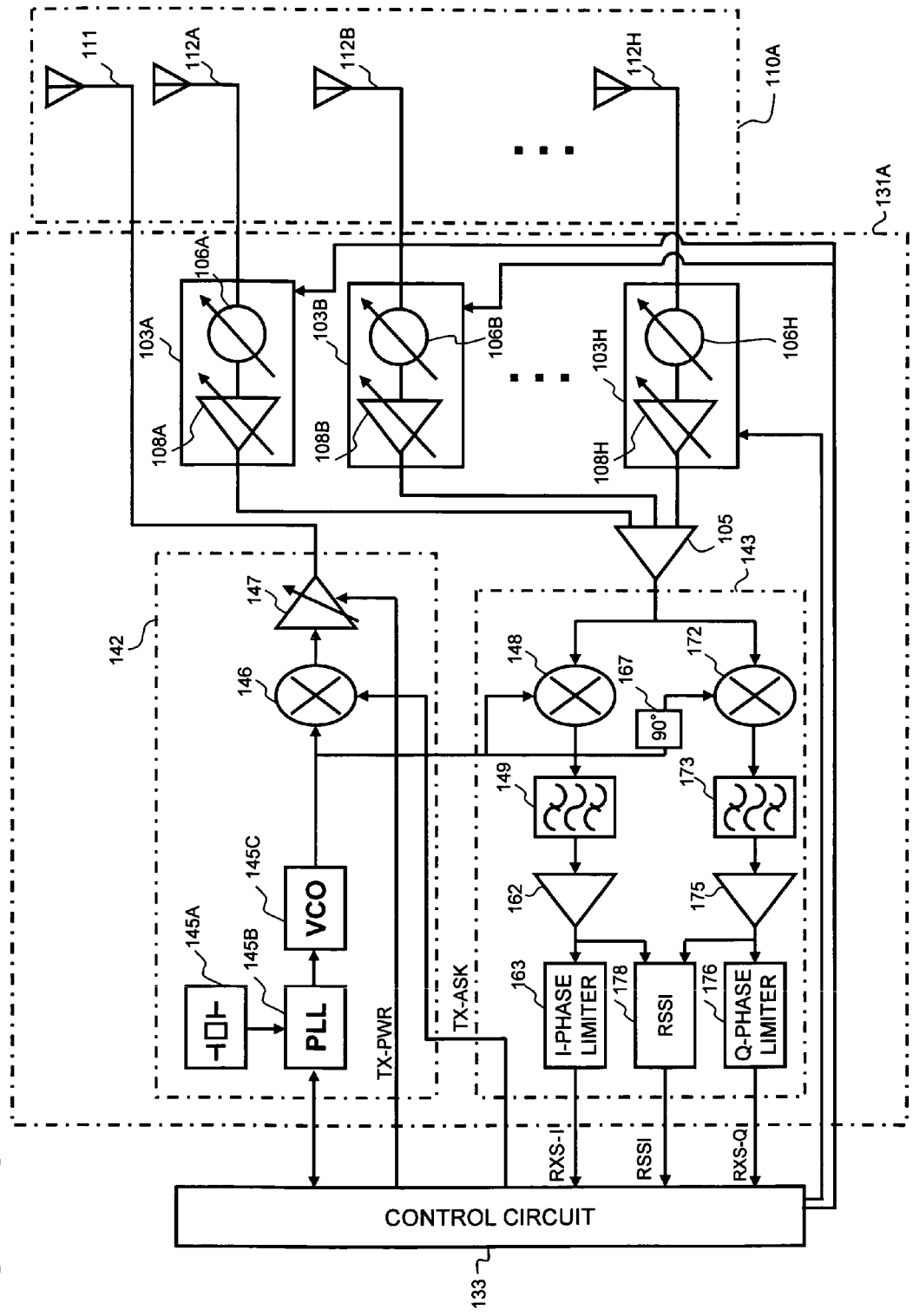
[FIG. 14]

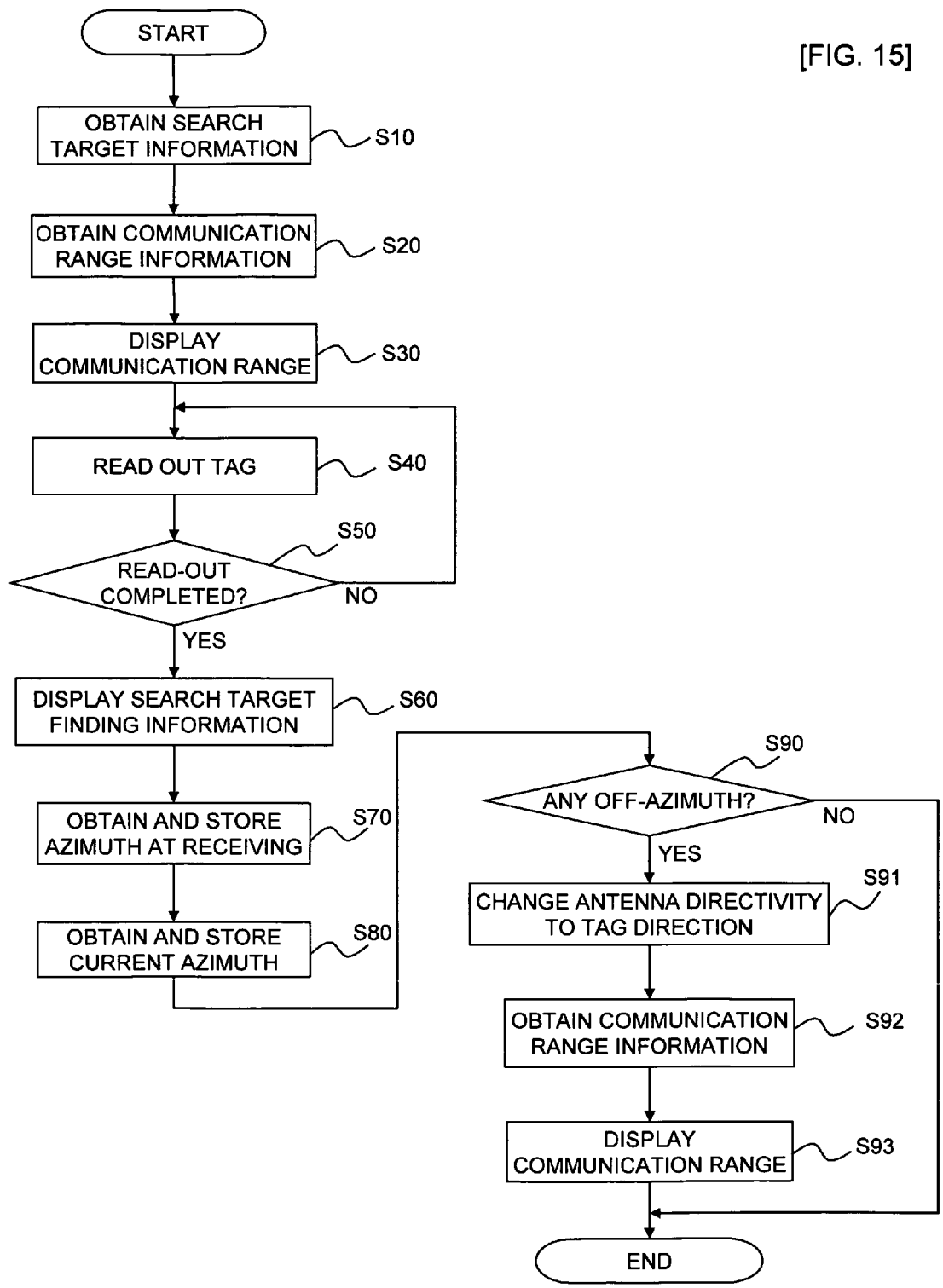

[FIG. 16A]
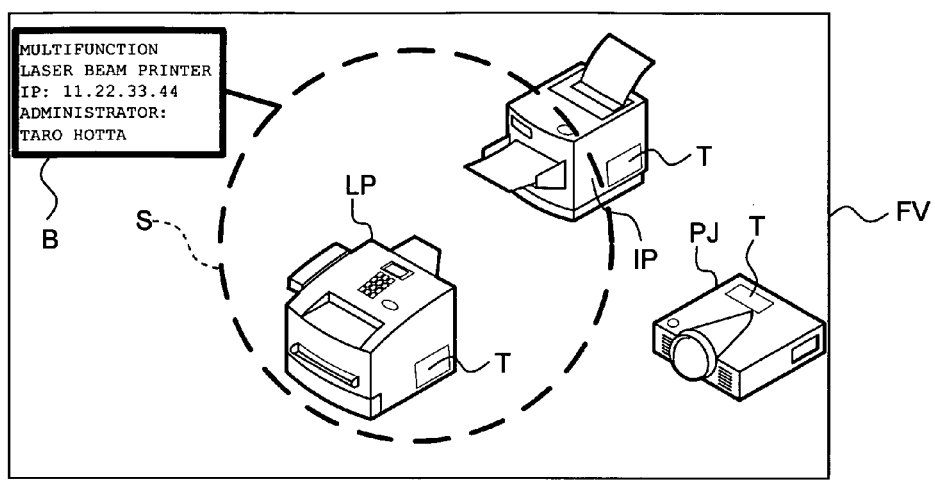
[FIG. 16B]
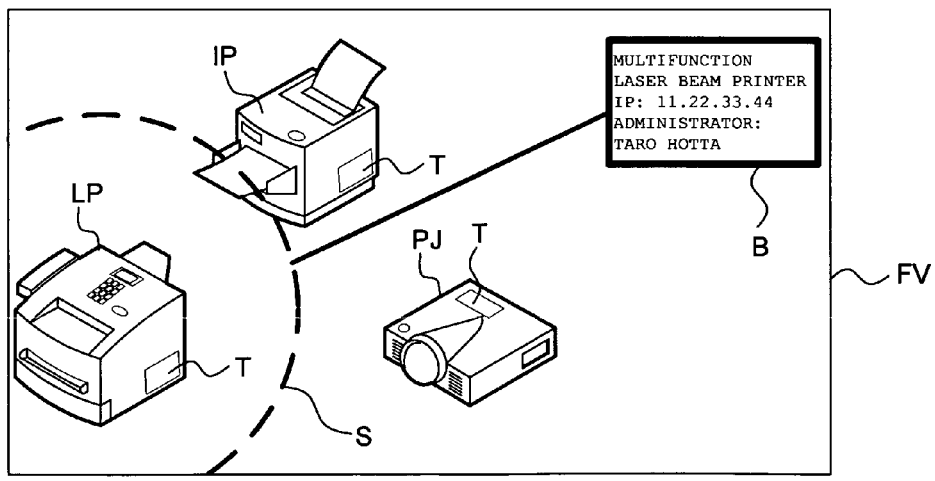

[FIG. 17]
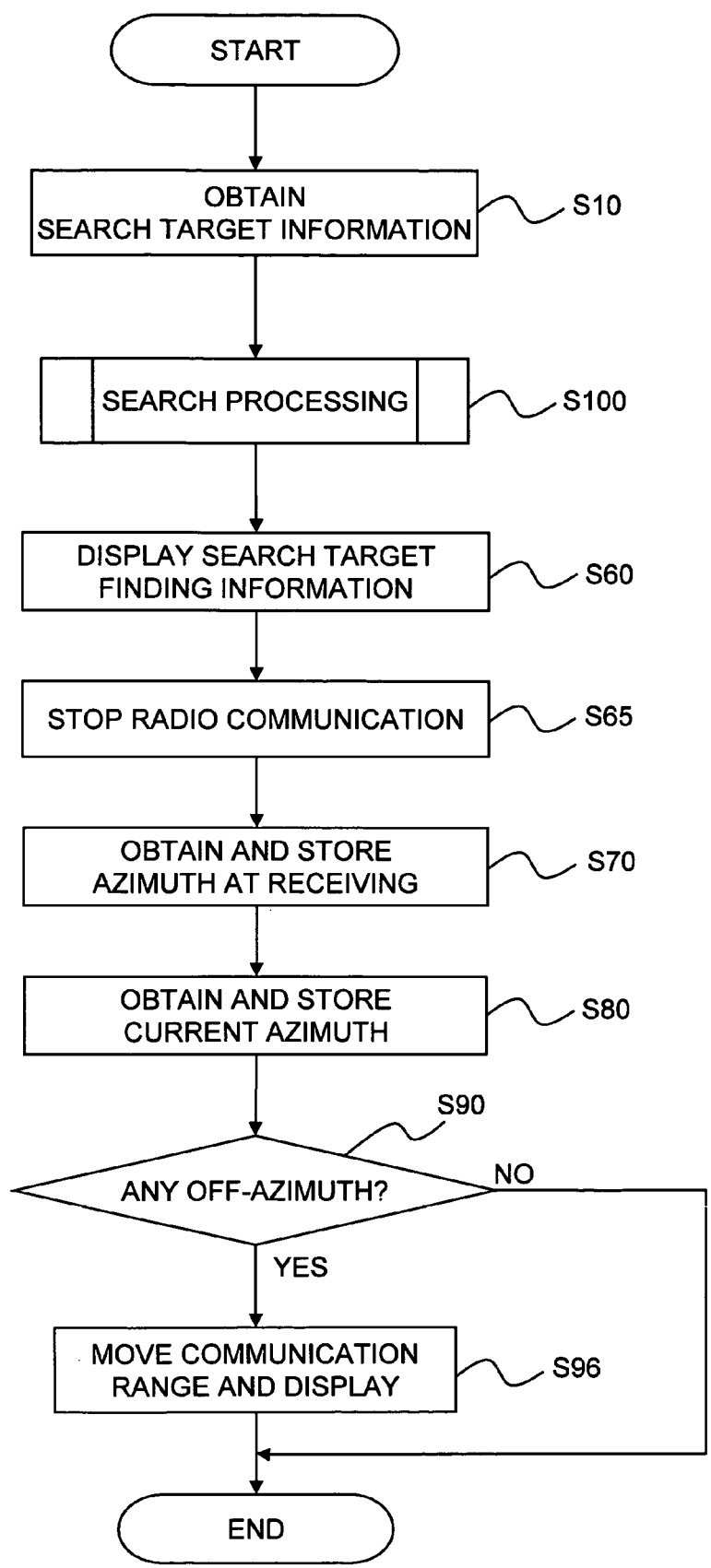

[FIG. 18]
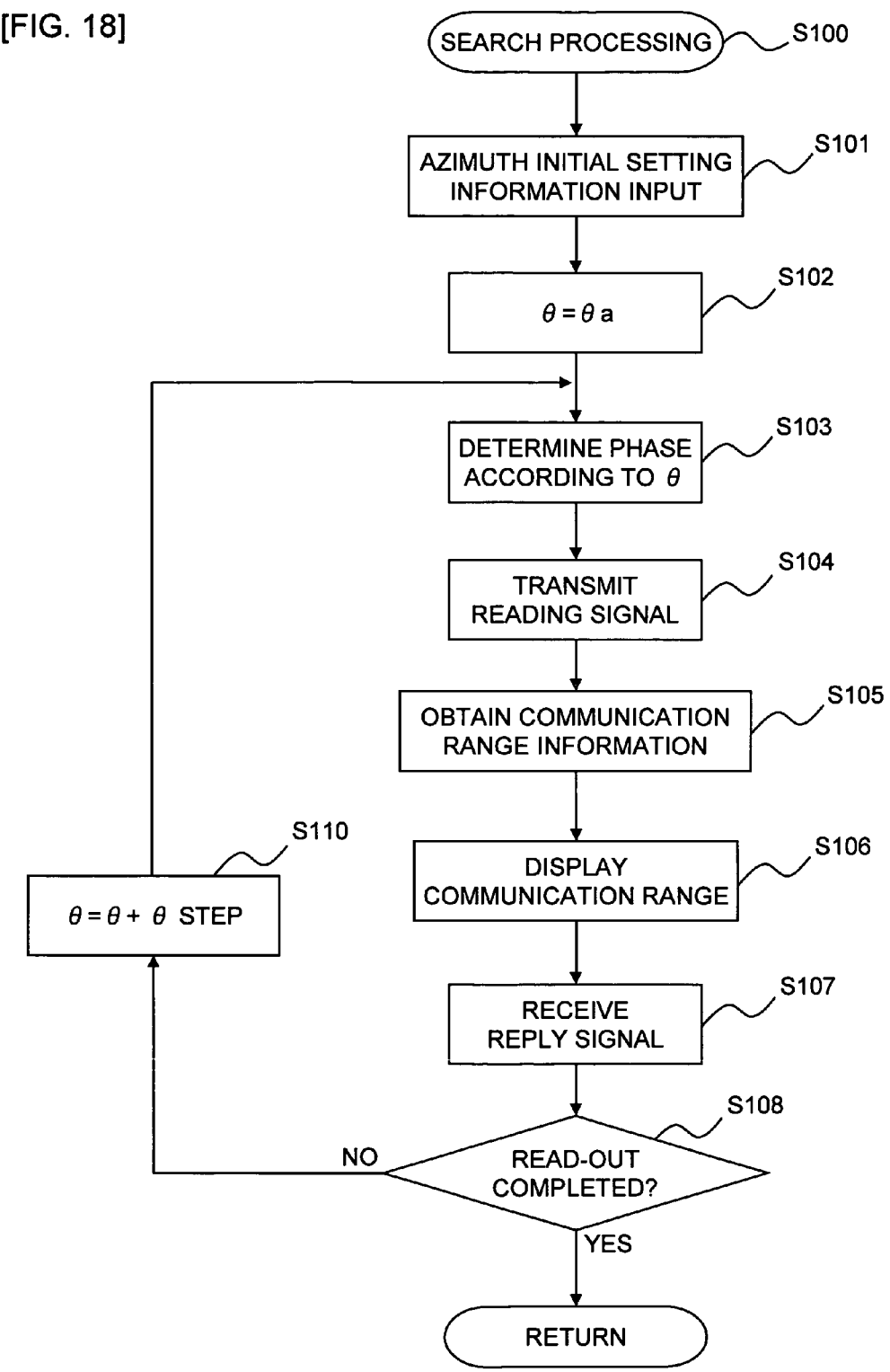

[FIG. 19A]
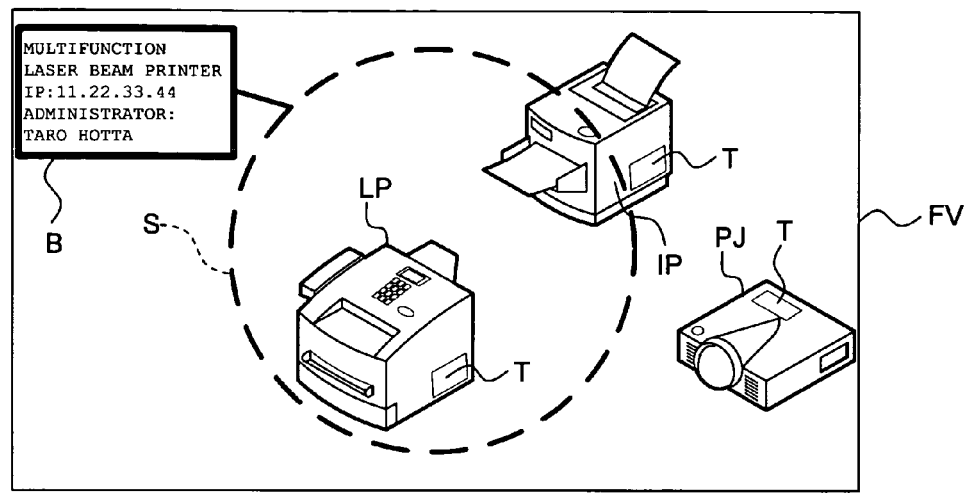
[FIG. 19B]
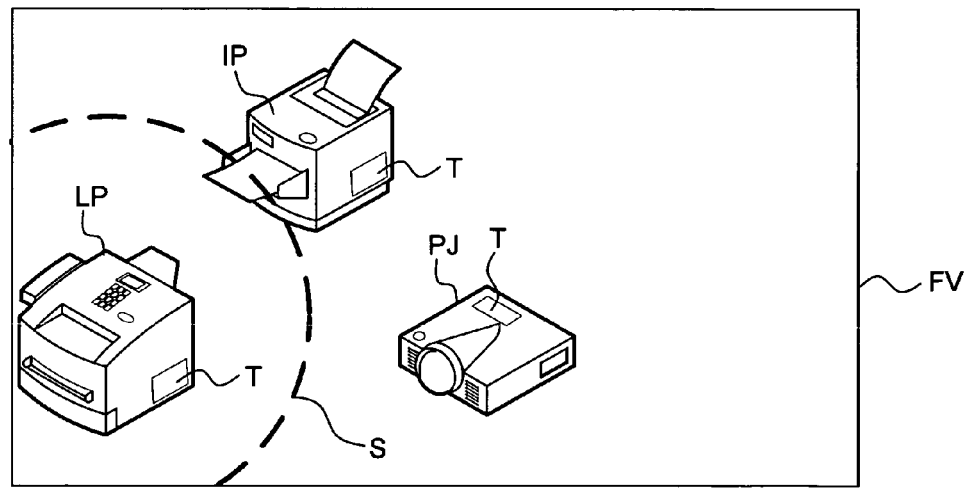

[FIG. 20]
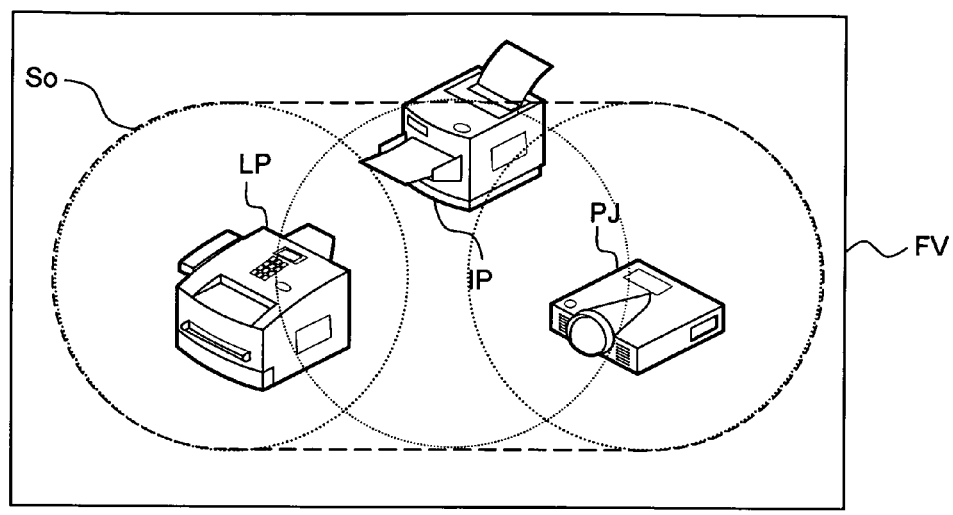
[FIG. 21]
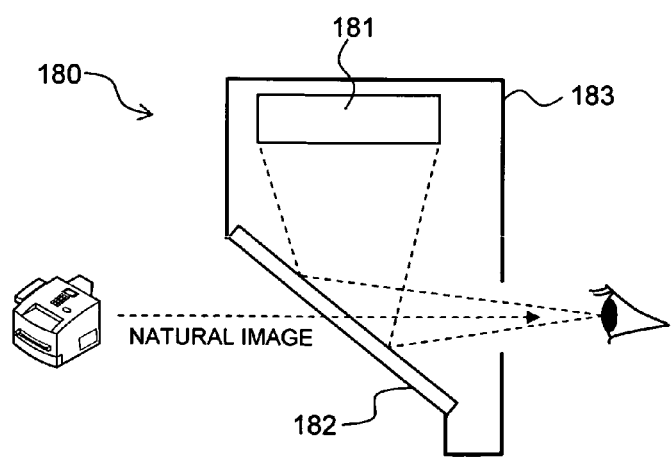

APPARATUS FOR SEARCHING RFID TAG

CROSS-REFERENCE TO RELATED APPLICATION

This application claims priority from JP 2008-026068, filed Feb. 6, 2008, the contents of which are hereby incorporated by reference.

BACKGROUND OF THE INVENTION

1. Field of the Invention

The present invention relates to an apparatus for searching a RFID tag configured to search a search target by carrying out radio communication with a RFID tag provided at the search target.

2. Description of the Related Art

Recently, a RFID (Radio Frequency Identification) system configured to carry out reading/writing of information contactlessly between a small-sized RFID tag that stores predetermined information and a reader (reading device)/writer (writing device) has been proposed and is being put into practice in various fields.

As an example of a practical use of the above RFID system, an apparatus for searching a RFID tag configured to search a search target by carrying out radio communication with a RFID tag provided at the search target can be cited (See JP,A, 2004-99278, for example). In this prior art, an operator wears a reader configured to get information of a RFID tag (baggage tag) provided at the search target (baggage) via radio communication and transparent display device (head-mount display) on the body, and when the operator moves and the RFID tag enters a communication range of the reader, the information is read and it is checked if the tag is the search target or not. If it is the search target, the fact is displayed on the display device to be notified to the operator.

In the above prior art, when an operator moves and a RFID tag enters a communication range of a reader, information of the RFID tag is read and it is checked if the tag is a search target or not. At this time, since the operator can not clearly recognize the communication range of the reader, there is a possibility that the RFID tag information of a target different from the target whose information is intended to be read by the operator and there is also a fear that certainty of search is lowered. Also, since the communication range can not be clearly recognized, the operator tries to get the information of the RFID tag by getting closer to the search target to be detected by all means without considering directivity of the reader and the like, and efficient search can not be made.

SUMMARY OF THE INVENTION

The present invention has an object to provide an apparatus for searching a RFID tag that can find a search target rapidly and surely by searching a RFID tag while visually recognizing a communication region.

BRIEF DESCRIPTION OF THE DRAWING

FIG. 1 is a system configuration diagram illustrating an entire configuration of a search system including an apparatus for searching a RFID tag of this embodiment.

FIG. 2 is a functional block diagram illustrating functional configurations of the apparatus for searching a RFID tag and a terminal.

FIG. 3 is a functional block diagram illustrating a detailed functional configuration of a display device.

FIG. 4 is a functional block diagram illustrating a detailed configuration of a radio frequency circuit.

FIG. 5 is a block diagram illustrating an example of a functional configuration of a RFID circuit element.

FIG. 6 is a flowchart illustrating a control procedure executed by a control circuit of the apparatus for searching a RFID tag.

FIGS. 7A and 7B are a diagram illustrating an example of a field of view when a communication region is visualized and displayed by the display device and a diagram illustrating an example of a field of view when search target finding information is visualized and displayed by the display device, respectively.

FIG. 8 is a flowchart illustrating a control procedure executed by the control circuit of the apparatus for searching a RFID tag in a variation in which a search target is visualized and displayed.

FIGS. 9A and 9B are a diagram illustrating an example of a field of view when the search target information is visualized and displayed by the display device and a diagram illustrating an example of the field of view when the search target finding information is visualized and displayed by the display device, respectively in a variation in which the search target is visualized and displayed.

FIG. 10 is a functional block diagram illustrating functional configurations of the apparatus for searching a RFID tag and a terminal in a variation in which azimuth display is made after the search target is found.

FIG. 11 is a flowchart illustrating a control procedure executed by the control circuit of the apparatus for searching a RFID tag in a variation in which the azimuth display is made after the search target is found.

FIGS. 12A and 12B are a diagram illustrating an example of a field of view when the search target finding information is visualized and displayed by the display device and a diagram illustrating an example of a field of view when direction information is visualized and displayed by the display device, respectively in a variation in which the azimuth display is made after the search target is found.

FIG. 13 is a functional block diagram illustrating functional configurations of the apparatus for searching a RFID tag and the terminal in a variation in which directivity is changed variably after the search target is found.

FIG. 14 is a functional block diagram illustrating a detailed configuration of the radio frequency circuit provided at the apparatus for searching a RFID tag in a variation in which directivity is changed variably after the search target is found.

FIG. 15 is a flowchart illustrating a control procedure executed by the control circuit of the apparatus for searching a RFID tag in a variation in which directivity is changed variably after the search target is found.

FIGS. 16A and 16B are a diagram illustrating an example of a field of view when the search target finding information is visualized and displayed by the display device and a diagram illustrating an example of a field of view when the communication region information is visualized and displayed by the display device after the directivity is changed variably, respectively in a variation in which the directivity is made variable after the search target is found.

FIG. 17 is a flowchart illustrating a control procedure executed by the control circuit of the apparatus for searching a RFID tag in a variation in which the directivity is made variable before the search target is found.

FIG. 18 is a flowchart illustrating a detailed procedure of search processing of Step S100.

FIGS. 19A and 19B are a diagram illustrating an example of a field of view when the search target finding information is visualized and displayed by the display device and a diagram illustrating an example of a field of view when the communication region information is visualized and displayed by the display device after movement, respectively in a variation in which the directivity is made variable before the search target is found.

FIG. 20 is a diagram illustrating an example of a field of view when the entire communication region that can be covered by change of the antenna directivity is visualized and displayed.

FIG. 21 is a diagram conceptually illustrating a configuration of a reflective head-mount display, which is an example of other display devices.

DETAILED DESCRIPTION OF THE PREFERRED EMBODIMENTS

An embodiment of the present invention will be described below referring to the attached drawings.

FIG. 1 is a system configuration diagram illustrating an entire configuration of a search system TS including an apparatus 100 for searching a RFID tag of this embodiment.

In FIG. 1, the search system TS has the apparatus 100 for searching a RFID tag held by an operator M, a base station 202 capable of information transmission/reception with the apparatus 100 for searching a RFID tag through an antenna 201 via radio communication such as wireless LAN and the like, and a terminal 300 connected to the base station 202 via a communication line NW and provided with a display portion 301 such as a liquid crystal display and an operation portion 302 such as a keyboard.

The apparatus 100 for searching a RFID tag has an antenna 110 provided with a predetermined directivity in order to carry out radio communication with a RFID tag T provided at a search target LP (a multifunction laser beam printer functioning as a FAX, copier, and printer in this example. Hereinafter described as "multifunction laser beam printer LP" as appropriate), a display device 120 capable of imparting a predetermined field of view FV (See FIG. 7 and the like, which will be described later) including a natural image of the search target LP to a vision of the operator M, and a control device 130 configured to carry out radio communication control with the RFID tag T via the antenna 110 and display control by the display device 120. The antenna 110, the display device 120, and the control device 130 are held on the head of the operator M.

The above display device 120 (display device) is provided with a transparent display of a so-called wearable type that can be attached to the body of the operator M, and the operator M can see the natural image (not an image generated by the display device 120 but an image that can be visually recognized by visible rays on the article concerned) of an article (all the targets to be visually recognized by visible rays by the operator M including an article, a person and the like other than the search target LP) in the field of view FV by transmission through the display and also can see the visualized image generated by the display device 120 superimposed on the natural image of the article in the field of view FV. In this embodiment, as the display device 120, a retinal scanning display is used (the details will be described later).

Also, the directivity of the antenna 110 (antenna device) is fixedly set so as to be in the same direction as that of the display device 120. Thereby, while the operator M attaches the display device 120 on the face, the directivity of the antenna 110 is in the same direction as that of the face of the operator M, and as shown in FIG. 1, a communication region S of a predetermined range is generated in the same direction as that of the face of the operator M along the directivity.

FIG. 2 is a functional block diagram illustrating functional configurations of the apparatus 100 for searching a RFID tag and the terminal 300.

The RFID tag T provided at the search target LP has a RFID circuit element To provided with an IC circuit part 150 storing information and a tag antenna 151 connected to the IC circuit part 150.

The control device 130 has a radio frequency circuit 131 configured to access the RFID circuit element To of the RFID tag T through the antenna 110 via radio communication and to process a signal read out of the RFID circuit element To, a wireless LAN communication portion 132 configured to carry out communication by wireless LAN with the base station 202 through the antenna 201, a control circuit 133 configured to control the entire apparatus 100 for searching a RFID tag including the radio frequency circuit 131, the wireless LAN communication portion 132, and the display device 120, and a storage portion 134 (RAM and the like) connected to the control circuit 133 and capable of information reading and writing.

The display device 120 is a retinal scanning display as mentioned above and has a display control portion 121 configured to control a light source unit 122 and a scanning portion 123, which will be described later, on the basis of a control signal from the control circuit 133 of the control device 130, the light source unit 122 having a light source configured to emit light on the basis of the control signal from the display control portion 121, and the scanning portion 123 configured to modulate a wavefront curvature of an outgoing light of the light source unit 122 on the basis of the control signal from the display control portion 121, to make scanning in the horizontal and vertical directions, and thereby to irradiate a pupil of the operator M with a light bundle while changing an incident angle thereto.

The terminal 300 has the display portion 301, the operation portion 302, a database 303 (a hard disk or a large-capacity memory and the like) storing search target information relating to the search target (including tag ID, article name, attributes and the like) capable of storing in/taking out and a control circuit 304 configured to control the entire terminal 300. The control circuit 304 is capable of information transmission/reception with the control circuit 133 of the apparatus 100 for searching a RFID tag via communication using wireless LAN through the communication line NW, the base station 202, and the antenna 201. As a result, in the terminal 300, when a search procedure, which will be described later, is to be carried out, if the operator M selects a search target using the operation portion 302 corresponding to the display on the display portion 301, the control circuit 304 searches the database 303 on the search target information relating to the selected search target and can transmit the read-out search target information to the apparatus 100 for searching a RFID tag via the communication line NW, the base station 202, and the antenna 201.

In the above, the terminal 300 is configured to have the database 303, but not limited to that, an information server for database may be provided separately from the terminal 300 or the apparatus 100 for searching a RFID tag may be configured to have the database. Also, in the above, the terminal 300 is configured to select the search target, but not limited to that, it may be so configured that the apparatus 100 for searching a RFID tag has an operation portion and the like, and the operator can select the search target in the apparatus 100 for searching a RFID tag.

FIG. 3 is a functional block diagram illustrating a detailed functional configuration of the display device 120.

In FIG. 3, the display control portion 121 calculates display image data on the basis of the control signal from the control circuit 133 and generates intensity modulation signals to an R light source 11, a G light source 12 and a B light source 13, a control signal to a wavefront curvature modulation portion 19, a synchronization signal to a luminous flux deflection system 20 and the like. Algorithms of these various calculations are known art usually used in the computer graphics field and the description here will be omitted. Outgoing light from each of the R, G, B light sources 11, 12, 13 are formed by collimate lenses 14a, 14b, 14c into substantially a parallel light bundle and then, multiplexed by wavelength selective mirrors 15, 16, 17 and enters one end of an optical fiber 18 by a focus lens 14d. Outgoing light from the other end of this optical fiber 18 is converted by a collimate lens 14e to a substantially parallel light bundle and made to enter the wavefront curvature modulation portion 19. The wavefront curvature modulation portion 19 applies modulation to a wavefront curvature (parallelism) of the incident light bundle according to a control signal from the display control portion 121. The outgoing light bundle from the wavefront curvature modulation portion 19 enters a luminous flux deflection system 20. The luminous flux deflection system 20 irradiates a pupil of the operator M with the light bundle while changing an incident angle thereto by a plurality of lenses and polygon mirrors, not shown.

The display device 120 is provided with two optical systems with the above configuration and supplies the light bundle to the both eyes of the operator M. As a result, the operator M can see the natural image of the article transmitted through the display in the field of view FV and can also see a visualized image by irradiation to the pupil carried out as above superimposed on the natural image in the field of view FV of the display device 120.

FIG. 4 is a functional block diagram illustrating a detailed configuration of the radio frequency circuit 131. Arrows shown in the diagram indicate an example of a flow of signals and do not limit the flow direction of the signals.

In FIG. 4, the radio frequency circuit 131 accesses information of the IC circuit part 150 of the RFID circuit element To through the antenna 110 and the control circuit 133 of the apparatus 100 for searching a RFID tag processes the signal read out of the IC circuit part 150 of the RFID circuit element To and reads out the information and creates various commands for making an access to the IC circuit part 150 of the RFID circuit element To.

The radio frequency circuit 131 includes a transmitting portion 142 configured to transmit a signal to the RFID circuit element To through the antenna 110, a receiving portion 143 configured to input a response wave from the RFID circuit element To received by the antenna 110, and a transmit-receive splitter 144.

The transmitting portion 142 (transmission processing device) is a block configured to create an interrogation wave to make an access to RFID tag information of the IC circuit part 150 of the RFID circuit element To. That is, the transmitting portion 142 includes a crystal oscillator 145A configured to output a reference signal of a frequency, a PLL (Phase Locked Loop) 145B and a VCO (Voltage Controlled Oscillator) 145C configured to divide/multiply frequency of the output of the crystal oscillator 145A by control of the control circuit 133 so as to generate a carrier wave with a predetermined frequency, a transmission multiplying circuit 146 (however, in the case of amplitude modulation, it may be replaced by an amplitude factor variable amplifier or the like) configured to modulate (in this example, amplitude modulation based on the "TX_ASK" signal from the control circuit 133) the carrier wave generated as above on the basis of a signal supplied from the control circuit 133, and a variable transmission amplifier 147 configured to amplify the modulated waves modulated by the transmission multiplying circuit 146 (with an amplification factor determined according to a "TX_PWR" signal from the control circuit 133 in this example) so as to generate a desired interrogation wave. The carrier wave generated as above uses a frequency of a UHF band (or microwave band or a short-wave band), for example, and the output from the variable transmission amplifier 147 is transmitted to the antenna 110 through the transmit-receive splitter 144 and is supplied to the IC circuit part 150 of the RFID circuit element To. The interrogation wave is not limited to a signal (modulated wave) modulated as above but may be a mere carrier wave depending on the case.

The receiving portion 143 (receiving processing device) includes an I-phase receiving signal multiplying circuit 148 that multiplies and demodulates a response wave from the RFID circuit element To received by the antenna 110 by the carrier wave generated as described above, an I-phase bandpass filter 149 that extracts only the signals within the necessary band from the output of the I-phase receiving signal multiplying circuit 148, an I-phase receiving signal amplifier 162 that amplifies the output from the I-phase bandpass filter 149, an I-phase limiter 163 that further amplifies the output of the I-phase receiving signal amplifier 162 and converts it to a digital signal, a Q-phase receiving signal multiplying circuit 172 that multiplies the response wave from the RFID circuit element To received at the antenna 110 by the carrier wave that is delayed by a phase shifter 167 by 90° after having been generated as described above, a Q-phase bandpass filter 173 that extracts only the signals within the necessary band from the output of the Q-phase receiving signal multiplying circuit 172, and a Q-phase receiving signal amplifier 175 that amplifies the output of the Q-phase bandpass filter 173, and a Q-phase limiter 176 that further amplifies the output of the Q-phase receiving signal amplifier 175 and converts it to a digital signal. A signal "RXS-I" output from the I-phase limiter 163 and a signal "RXS-Q" output from the Q-phase limiter 176 are input to the control circuit 133 for processing.

Also, the outputs from the I-phase receiving signal amplifier 162 and the Q-phase receiving signal amplifier 175 are input to a RSSI (Received Signal Strength Indicator) circuit 178 as intensity detection means and a signal "RSSI" indicating the intensity of these signals is input to the control circuit 133. As a result, the apparatus 100 for searching a RFID tag can detect signal intensity from the RFID circuit element To at communication with the RFID circuit element To.

FIG. 5 is a block diagram illustrating an example of a functional configuration of the RFID circuit element To. Arrows shown in the diagram indicate an example of a flow of signals and do not limit the flow direction of the signals.

In FIG. 5, the RFID circuit element To has, as mentioned above, the tag antenna 151 for transmission/reception of a signal contactlessly with the antenna 110 of the apparatus 100 for searching a RFID tag and the IC circuit part 150 connected to the tag antenna 151.

The IC circuit part 150 includes a rectification part 152 that rectifies an interrogation wave received by the tag antenna 151, a power source part 153 that accumulates energy of the interrogation wave rectified by the rectification part 152 so as to make it a driving power supply, a clock extraction part 154 that extracts a clock signal from the interrogation wave received by the tag antenna 151 so as to supply it to a control part 157, a memory part 155 that can store a predetermined information signal, a modem part 156 connected to the tag antenna 151, and the control part 157 that controls operation of the RFID circuit element To through the memory part 155, the clock extraction part 154, the modem part 156 and the like.

The modem part 156 demodulates a communication signal from the antenna 110 of the apparatus 100 for searching a RFID tag received by the tag antenna 151 and modulates a reply signal from the control part 157 and transmits it as a response wave (signal including a tag ID) from the tag antenna 151.

The clock extraction part 154 extracts a clock component from a received signal and extracts a clock to the control part 157 and supplies a clock corresponding to a frequency of the clock component of the received signal to the control part 157.

The control part 157 interprets a received signal demodulated by the modem part 156, generates a reply signal on the basis of the information signal stored in the memory part 155, and executes basic control such as control to return a reply signal from the tag antenna 151 by the modem part 156.

FIG. 6 is a flowchart illustrating a control procedure executed by the control circuit 133 of the apparatus 100 for searching a RFID tag.

First, at Step S10, the control circuit 133 gets search target information transmitted from the terminal 300. The search target information is received, as mentioned above, such that when the operator M selects a search target using the operation portion 302 corresponding to the display on the display portion 301 at the terminal 300, the control circuit 304 searches search target information relating to the selected search target in the database 303 and transmits the read-out search target information through the communication line NW, the base station 202, and the antenna 201. The search target information includes a tag ID of the RFID circuit element To provided at an article to be searched, an article name, attribute information of the article (administrator information or network address if the article is network-connected equipment, for example) and the like, as mentioned above.

At the subsequent Step S20, the control circuit 133 gets communication region information. The communication region information includes directivity information relating to directivity of the antenna 110 and transmission power information relating to an output of a signal when the information is transmitted to the RFID circuit element To of the RFID tag T through the antenna 110, and by the directivity information, a direction of a main lobe of the communication region of the antenna 110 is determined and by the transmission power information, the size of the communication region is determined. That is, by the directivity information, a display position in the field of view FV in a communication region S (See FIG. 7A, which will be described later) visualized and displayed in the field of view FV is determined, and by the transmission power information, the size of the communication region S visualized and displayed in the field of view FV is determined. In this embodiment, the directivity of the antenna 110 is fixedly set so as to be in the same direction as that of the display device 120 as mentioned above, and the transmission power is set in advance to a predetermined value, and the set values are stored in the above-mentioned storage portion 134, respectively. Therefore, the control circuit 133 reads out and gets the directivity information and the transmission power information from the above storage portion 134.

At the subsequent Step S30, on the basis of the communication region information acquired at Step S20, the control circuit 133 outputs a display signal to the display control portion 121 of the display device 120. As a result, the display control portion 121 outputs a control signal to the light source unit 122 and the scanning portion 123, the outgoing light from the light source is modulated and scanned and irradiated into the pupil of the operator M while its incident angle is changed. As a result, the communication region S is visualized and displayed in the field of view FV of the display device 120 (See FIG. 7A, which will be described later).

At the subsequent Step S40, the control circuit 133 transmits a control signal to the transmitting portion 142 of the radio frequency circuit 131 so as to have the crystal oscillator 145A, the PLL 145B, and the VCO 145C generate a carrier wave of a UHF band (915 MHz, for example), for example, the carrier wave generated on the basis of the control signal is modulated and amplified and a read-out signal (inquiry signal) is transmitted to the IC circuit part 150 of the RFID circuit element To through the transmit-receive splitter 144 and the antenna 110. The transmission of the read-out signal is carried out corresponding to the transmission power and the directivity on the basis of the transmission power information and the directivity information acquired at Step S20.

At the subsequent Step S50, the control circuit 133 receives a response signal corresponding to the read-out signal from the IC circuit part 150 of the RFID circuit element To which the read-out signal was transmitted and determines if the tag ID obtained on the basis of the response signal matches the tag ID of the search target or not. If not matched, it is considered that information reading from the RFID circuit element To has not been completed, the determination is not satisfied and the routine goes to Step S40. On the other hand, if matched, it is considered that the information reading from the RFID circuit element To has been completed, the determination is satisfied, and the routine goes to the subsequent Step S60.

At Step S60, the control circuit 133 outputs a display signal to the display control portion 121 of the display device 120 and visualizes and displays finding information that the search target is found in the field of view FV of the display device 120 (See FIG. 7B, which will be described later). Then, this flow is finished.

In the above, Step S20 constitutes region information acquisition portion that gets the communication region information corresponding to the communication region generated by the antenna device along the directivity described in each claim, and Step S30 constitutes region display control portion that generates a display signal for carrying out visualization display of the communication region in a predetermined field of view of the display device on the basis of the communication region information acquired by the region information acquisition portion and outputs it to the display device. Step S60 constitutes receiving display control portion that generates a display signal for making a corresponding display in the predetermined field of view when a response signal from the RFID tag according to the inquiry signal is received by the receiving processing device and outputs it to the display device.

The above flowchart does not limit the present invention to the procedure shown in the flow but addition, deletion or change of order and the like of the procedure are possible in a range not departing from the gist and technical idea of the invention.

FIG. 7A is a view illustrating an example of the field of view FV when the communication region S is visualized and displayed by the display device 120 at Step S30, and FIG. 7B is a view illustrating an example of the field of view FV when the search target finding information is visualized and displayed by the display device 120 at Step S60.

In FIGS. 7A and 7B, in the field of view FV of the display device 120, since the directivity of the antenna 110 is fixedly set so as to be in the same direction as that of the display device 120, as mentioned above, the communication region S is visualized and displayed substantially at the center part. The size of the visualized and displayed communication region S corresponds to the transmission power set in advance.

The example shown in FIG. 7A is a state where the multi-function laser beam printer LP to be searched is not included in the field of view FV but natural images of a usual printer IP not to be searched and a projector PJ are included in the field of view FV. At this time, since the RFID tag T provided at the printer IP is present in the communication region S, the information of the RFID tag T has been received through the antenna 110 via radio communication, but since the tag is not a target to be searched, finding information B is not visualized or displayed.

In the example shown in FIG. 7B, the multifunction laser beam printer LP to be searched is included in the field of view FV and the RFID tag T provided at the multifunction laser beam printer LP is present in the communication regions. As a result, the information of the RFID tag T is received through the antenna 110 via radio communication, and the finding information B is visualized and displayed. The finding information B includes search target information (name of the search target LP, network address and the name of administrator in this example).

The finding information B when the search target LP is found is not limited to the above. For example, instead of the search target information, text or drawing (pattern, symbol and the like) information notifying the finding such as "Bingo!" may be visualized and displayed or a display mode of the communication region S (change of a color of a region frame or the entire area in the region, flashing/rotating operation of the region frame and the like) may be changed. Alternatively, the finding of the search target LP may be notified by change of the whole or a part of display mode of the field of view FV (change of color and the like).

In the apparatus 100 for searching a RFID tag of this embodiment described above, the display device 120 that is held by the body of the operator M and gives a predetermined field of view FV is constituted as a transparent type, and the operator M can see the natural image of the search target LP in the field of view FV by means of it. On the other hand, in the apparatus 100 for searching a RFID tag, the antenna 110 for carrying out radio communication with the RFID tag T provided at the search target LP is provided with predetermined directivity. The communication region S is generated from the antenna 110 along the directivity, and the communication region information corresponding to that is received by the control circuit 133. Then, on the basis of the communication region information transmitted from the control circuit 133, by control of the display control portion 121 of the display device 120, the communication region S is visualized and displayed in the field of view FV of the display device 120.

As mentioned above, at communication with the RFID tag T, the communication region S from the antenna 110 is visualized and displayed. Thereby, since the operator M can search the RFID tag T while visually recognizing the communication region S, the operator M can find the search target rapidly and surely.

Also, particularly in this embodiment, the control circuit 133 gets the directivity information relating to the directivity of the antenna 110 and the transmission power information relating to the transmission power of the signal output through the antenna 110 as the communication region information. The size of the communication region S can be determined by thus received transmission power information and the direction of the main lobe of the communication region S can be determined by the directivity information. As a result, by these two pieces of information, an accurate position of the communication region S can be surely specified and can be visualized and displayed in the field of view of the display device 120 with accuracy.

Also, particularly in this embodiment, the inquiry signal generated at the transmitting portion 142 of the radio frequency circuit 131 is transmitted into the communication region S through the antenna 110. If the RFID tag T corresponding to the search target LP is present in the communication region S, a response signal corresponding to the inquiry signal is transmitted from the RFID tag T and received by the receiving portion 143 through the antenna 110. At this time, the corresponding finding information B is visualized and displayed in the field of view FV of the display device 120. As a result, the fact that the RFID tag T to be searched is detected in the communication region S can be surely notified to the operator M.

The present invention is not limited to the above embodiment but various variations are possible in a range not departing from its gist and technical idea. Such variations will be described in order.

(1) When a Search Target is to be Visualized and Displayed:

Though not particularly carried out in the above embodiment, the search target information may be displayed in the field of view FV of the display device 120 during the search so that the operator M may easily search the search target LP.

FIG. 8 is a flowchart illustrating a control procedure executed by the control circuit 133 of the apparatus 100 for searching a RFID tag in this variation and corresponds to the above-mentioned FIG. 6. The procedure similar to that in FIG. 6 is given the same reference numeral and the description will be omitted as appropriate.

At Step S10, similarly to the above-mentioned FIG. 6, the control circuit 133 gets the search target information transmitted from the terminal 300.

At the subsequent Step S15, the control circuit 133 outputs a display signal to the display control portion 121 of the display device 120 on the basis of the search target information received at Step S10. As a result, in the field of view FV of the display device 120, the search target information is visualized and displayed (See FIG. 9A, which will be described later).

The subsequent Step S20 to Step S60 are similar to the above-mentioned FIG. 6, and the control circuit 133 gets the communication region information, outputs the display signal to the display control portion 121 of the display device 120 on the basis of the acquired communication region information, and has the communication region S be visualized and displayed in the field of view FV of the display device 120. Then, information reading is carried out from the RFID circuit element To of the RFID tag T, and if the search target LP is found, the finding information indicating the finding of the search target is visualized and displayed in the field of view FV of the display device 120 (See FIG. 9B, which will be described later). Then, this flow is finished.

In the above, Step S10 constitutes target information acquisition portion that gets the search target information relating to the search target described in each claim, and Step S15 constitutes target display control portion that generates a display signal for visualization display of the search target information acquired by the target information acquisition portion in a predetermined field of view and outputs it to the display device.

The above flowchart does not limit the present invention to a procedure shown in the above flow but is capable of addition, deletion or change of order and the like of the procedure in a range not departing from the gist and technical idea of the invention.

FIG. 9A is a diagram illustrating an example of the field of view FV when the search target information is visualized and displayed by the display device 120 at Step S15, and FIG. 9B is a diagram illustrating an example of the field of view FV when the search target finding information is visualized and displayed by the display device 120 at Step S60.

As shown in FIG. 9A, at a position on the outer circumference side not overlapping the communication region S in the field of view FV, search target information I relating to the search target LP is visualized and displayed. In this example, the search target information I includes appearance image information of the multifunction laser beam printer LP to be searched and text information made up of name, network address, and name of the administrator of the multifunction laser beam printer LP. At this time, though RFID tags T of the usual printer IP and the projector PJ not to be searched are present in the communication region S, the RFID tag T of the multifunction laser beam printer LP to be searched is not included in the communication region S, and this is a state before the search target LP is found. Thus, the finding information B is not visualized or displayed.

As shown in FIG. 9B, when the multifunction laser beam printer LP to be searched is found, in this example, the search target information I moves into the communication region S from the outer circumference side and moves so as to overlap the natural image of the actual multifunction laser beam printer LP (may be enlarged/size-reduced as appropriate). The finding of the search target LP is notified to the operator M by change of the display mode of the search target information I as above.

The notification mode when the search target LP is found is not limited to the above. For example, other than change of the display portion and size of the search target information I as above, the display color may be changed or at least one display mode of the display portion, size, and display color may be changed. Alternatively, the search target information I may be operated such as flashing, rotating and the like.

According to the variation described as above, since the search target information I is visualized and displayed in the field of view FV of the display device 120, when the operator M conducts a search, the operator can search the search target LP while visually recognizing it in the field of view FV of the display device 120 surely, which improves convenience.

Also, particularly in this variation, in the field of view FV of the display device 120, an appearance image of the multifunction laser beam printer LP is visualized and displayed in the search target information I. As a result, the operator M can easily check the created appearance image of the search target LP with the natural image of the search target LP actually recognized visually at the search, which further improves convenience. Also, it gives an effect that an unknown search target asked to search by another person can be easily searched.

Also, particularly in this variation, in the field of view FV of the display device 120, in the search target information I, text information such as the article name and attribute information (administrator name, network address and the like) of the multifunction laser beam printer LP is visualized and displayed. As a result, when the search is made while the target is visually recognized in the field of view FV of the display device 120 actually, the operator M can also visually recognize the text information of the search target LP, which improves convenience.

Also, particularly in this variation, in the field of view FV of the display device 120, the search target information I is displayed at a position not overlapping the communication region S in the field of view FV. As a result, ease to see the search target information I and the communication region S, respectively, can be ensured.

Also, particularly in this variation, in the field of view FV of the display device 120, the search target information I is displayed on the outer circumference side so that it does not overlap the communication region S displayed on the center side. In this way by displaying the communication region S in the center side of the field of view FV and by displaying the search target information I on the outer circumference side not overlapping that, ease to see each can be ensured.

Also, particularly in this variation, when the search target LP is found, the search target information I having been displayed in the field of view FV of the display device 120 is newly displayed in the field of view FV with its display mode changed. In this way, by changing the display mode of the search target information I which has been displayed, the fact of the detection of the RFID tag T can be notified to the operator M without newly making another display corresponding to the detection of the RFID tag T.

Also, particularly in this variation, when the search target LP is found, at least one of the display portion, display size and display color of the search target information I in the field of view FV is changed and displayed. By changing the display portion, size or color of the search target information I which has been displayed, the detection of the RFID tag T can be visually and clearly notified to the operator M.

(2) When Azimuth is Displayed after the Search Target is Found:

FIG. 10 is a functional block diagram illustrating functional configurations of the apparatus 100 for searching a RFID tag and the terminal 300 in this variation and corresponds to the above-mentioned FIG. 2. The same reference numerals are given to those similar to FIG. 2 and the description will be omitted.

In this variation, the apparatus 100 for searching a RFID tag has an electronic compass 135 (azimuth detecting device) that detects azimuth information (absolute azimuth based on the earth or relative azimuth based on a specific article) of the display device 120. The azimuth information detected by the electronic compass 134 is input to the control circuit 133 and stored in the storage portion 134 (azimuth storage device) capable of being read out. The other configurations are the same as that of the above-mentioned FIG. 2.

FIG. 11 is a flowchart illustrating a control procedure executed by the control circuit 133 of the apparatus 100 for searching a RFID tag of this variation and corresponds to the above-mentioned FIG. 6 and the like. The same reference numerals are given to the procedures similar to FIG. 6 and the like and the description will be omitted.

Step S10 to Step S60 are similar to the above-mentioned FIG. 6. That is, the control circuit 133 gets the search target information transmitted from the terminal 300, gets the communication region information from the storage portion 134, outputs a display signal to the display control portion 121 of the display device 120 on the basis of thus received communication region information and has the communication region S be visualized and displayed in the field of view FV of the display device 120. Then, information reading is carried out with respect to the RFID circuit element To of the RFID tag T, and if the search target LP is found, the finding information indicating that the search target is found is visualized and displayed in the field of view FV of the display device 120.

At the subsequent Step S70, the control circuit 133 gets the azimuth information when a response signal from the RFID tag T relating to the search target LP is received at Step S50 (hereinafter described as "azimuth information at receiving" as appropriate) from the electronic compass 135 and stores it in the storage portion 134.

At the subsequent Step S80, the control circuit 133 gets the current azimuth information (hereinafter described as "relative azimuth information" as appropriate) from the electronic compass 135 and stores it in the storage portion 134.

At the subsequent Step S90, the control circuit 133 reads out the azimuth information at receiving and the relative azimuth information from the storage portion 134, calculates their difference, and determines if the azimuths have a difference or not. If there is no difference between the azimuths, it can be considered that the position or attitude of the apparatus 100 for searching a RFID tag has not been changed since the response signal from the RFID tag T relating to the search target LP was received at Step S50, and the determination is not satisfied and this flow is finished. On the other hand, if there is a difference between the azimuths, it can be considered that the position or attitude of the apparatus 100 for searching a RFID tag has been changed since the response signal from the RFID tag T relating to the search target LP was received, the determination is satisfied and the routine goes to the subsequent Step S95.

At Step S95, the control circuit 133 outputs a display signal to the display control portion 121 of the display device 120 on the basis of the difference between the azimuth information at receiving and the relative azimuth information calculated at Step S90. As a result, the display control portion 121 visualizes and displays direction information corresponding to a location of the RFID tag T of the search target LP in the field of view FV of the display device 120 (See FIG. 12B, which will be described later). Then, this flow is finished.

In the above, Step S95 constitutes direction display control portion that generates a display signal for making a display corresponding to location information of the RFID tag in the predetermined field of view and outputs it to the display device described in each claim.

The above flowchart does not limit the present invention to a procedure shown in the above flow but is capable of addition, deletion or change of order and the like of the procedure in a range not departing from the gist and technical idea of the invention.

FIG. 12A is a diagram illustrating an example of the field of view FV when the search target finding information is visualized and displayed by the display device 120 at Step S60, and FIG. 12B is a diagram illustrating an example of the field of view FV when the direction information is visualized and displayed by the display device 120 at Step S95.

In FIG. 12A, the RFID tag T provided at the multifunction laser beam printer LP to be searched is present in the communication region S, and the information of the RFID tag T is through the antenna 110 via radio communication and the finding information B is visualized and displayed.

FIG. 12B is a state after the position or attitude of the entire apparatus 100 for searching a RFID tag is changed from the state in FIG. 12A due to movement of the face of the operator M and the like and the field of view FV is moved to a predetermined direction (right direction in FIG. 12). At this time, the multifunction laser beam printer LP to be searched is outside the field of view FV but direction information Y indicating the location information of the RFID tag T of the multifunction laser beam printer LP is visualized and displayed substantially at the center part in the field of view FV.

In the above, the direction information Y is indicated by an arrow, but not limited to that. For example, the direction may be shown by displaying the appearance image information of the multifunction laser beam printer LP to be searched on an outer circumference portion on the side in the corresponding direction in the field of view FV, or the appearance image may be further flashed or the like. Alternatively, in addition to the arrow and the appearance image information, text information indicating the direction or distance may be displayed at the same time.

In the above described variation, the apparatus 100 for searching a RFID tag has the electronic compass 135 that detects the azimuth information of the display device 120 and stores the azimuth at receiving of the apparatus 100 for searching a RFID tag at detection of the RFID tag T relating to the search target LP in the storage portion 134. As a result, when the position or attitude of the display device 120 or the entire apparatus 100 for searching a RFID tag is changed and its direction is changed, the directional change can be detected, and moreover, after the detection of the tag, if the position or attitude of the display device 120 or the entire apparatus 100 for searching a RFID tag is changed and the direction is changed, the directional change can be calculated on the basis of the stored azimuth at receiving.

Also, particularly in this variation, after the detection of the RFID tag T relating to the search target LP, even if the position or attitude of the display device 120 or the entire apparatus 100 for searching a RFID tag is changed and the direction is changed, display is made in a form that the directional change (displacement) is corrected. As a result, the location information of the RFID tag T can be surely notified to the operator M. Also, even if the direction of the display device 120 or the entire apparatus 100 for searching a RFID tag is largely changed and communication with the RFID tag T is disrupted as shown in FIG. 12B, the location information of the RFID tag T can be continued to be notified in the field of view FV.

(3) When Directivity is Made Variable after the Search Target is Found:

FIG. 13 is a functional block diagram illustrating functional configurations of the apparatus 100 for searching a RFID tag and the terminal 300 in this variation and corresponds to the above-mentioned FIG. 10. The same reference numerals are given to those similar to FIG. 10 and the description will be omitted.

The apparatus 100 for searching a RFID tag in this variation has a radio frequency circuit 131A and an antenna 110A having a plurality of antenna elements. The control circuit 133 makes so-called phased-array antenna control by sequentially changing the direction while holding the directivity of the plurality of antenna elements of the antenna 110A (main lobe) in a predetermined direction.

FIG. 14 is a functional block diagram illustrating a detailed configuration of the radio frequency circuit 131A of the apparatus 100 for searching a RFID tag in this variation and corresponds to the above-mentioned FIG. 4. The same reference numerals are given to those similar to FIG. 4 and the description will be omitted. Arrows shown in the diagram indicate an example of a flow of signals and do not limit the flow direction of the signals.

In FIG. 13, the antenna 110A is constituted by one transmission antenna (antenna element) 111 and a plurality of (eight, in this case) receiving antennas (antenna elements) 112A, 112B, 112C, 112D, 112E, 112F, 112G, and 112H (however, in order to prevent complexity, a part of them is not shown, and the same applies to the following).

The radio frequency circuit 131A has the transmitting portion 142 and the receiving portion 143 for making an access to the information of the IC circuit part 150 of the RFID circuit element To via the transmission antenna 111 and the receiving antennas 112A, 112B, 112C, 112D, 112E, 112F, 112G, and 112H, phase control units 103A, 103B, 103C, 103D, 103E, 103F, 103G, and 103H relating to the receiving antennas 112A, 112B, 112C, 112D, 112E, 112F, 112G, and 112H, respectively, and an adder 105 for adding an output from these phase control units 103A to 103H and is connected to the control circuit 133 configured to process a signal read out of the IC circuit part 150 of the RFID circuit element To and to read out the information and including a function that creates access information to make an access to the IC circuit part 150 of the RFID circuit element To.

The phase control units 103A, 103B, 103C, 103D, 103E, 103F, 103G, and 103H include phase shifters 106A, 106B, 106C, 106D, 106E, 106F, 106G, and 106H to which a phase control signal from the control circuit 133 is input and a phase of a received radio wave signal at the receiving antennas 112A, 112B, 112C, 112D, 112E, 112F, 112G, and 112H is set variably, respectively, according to the phase control signal and variable gain amplifiers (amplification factor variable amplifiers) 108A, 108B, 108C, 108D, 108E, 108F, 108G, and 108H to which a signal from the control circuit 133 is input and that variably amplify the signal input from the phase shifters 106A, 106B, 106C, 106D, 106E, 106F, 106G, and 106H according to the signal from the control circuit 133 and outputs the amplified signal to the adder 105.

Since the configuration other than the above is the same as that of the above-mentioned FIG. 4, the description will be omitted.

FIG. 15 is a flowchart illustrating a control procedure executed by the control circuit 133 of the apparatus 100 for searching a RFID tag in this variation and corresponds to the above-mentioned FIG. 11. The same procedures as those in FIG. 11 are given the same reference numerals and the description will be omitted as appropriate.

Step S10 to Step S90 are the same as the above-mentioned FIG. 11. That is, the control circuit 133 gets the search target information transmitted from the terminal 300 and gets the communication region information from the storage portion 134, outputs a display signal to the display control portion 121 of the display device 120 on the basis of thus received communication region information, and has the communication region S be visualized and displayed in the field of view FV of the display device 120. Then, information reading is carried out with respect to the RFID circuit element To of the RFID tag T, and if the search target LP is found, the finding information indicating that the search target is found is visualized and displayed in the field of view FV of the display device 120.

Also, at this time, the control circuit 133 gets the azimuth information at receiving from the electronic compass 135 and stores it in the storage portion 134 and gets the subsequent relative azimuth information from the electronic compass 135 and stores it in the storage portion 134. Then, the control circuit 133 reads out the azimuth information at receiving and the relative azimuth information from the storage portion 134, calculates their difference and determines if there is a difference between the azimuths. If there is no difference between the azimuths, this flow is finished. On the other hand, if there is a difference between the azimuths, it can be considered that the position or attitude of the apparatus 100 for searching a RFID tag has been changed since a response signal was received from the RFID tag T relating to the search target LP, and the determination is satisfied and the routine goes to the subsequent Step S91.

At Step S91, a phase control signal is output to the phase control units 103A to 103H of the radio frequency circuit 131A, and on the basis of the difference between the azimuth information at receiving and the relative azimuth information calculated at Step S90, the directivity of the antenna 110A is changed variably so as to correct the displacement.

Subsequently, at Step S92 and Step S93, the communication region information (directivity information and transmission power information based on the directivity variable control) is obtained, and on the basis of thus obtained communication region information, a display signal is output to the display control portion 121 of the display device 120 so that the communication region S is visualized and displayed in the field of view FV of the display device 120. Then, this flow is finished.

In the above, Step S91 constitutes directivity control portion that variably controls a direction of the directivity of the antenna device described in each claim. Further, Step S30 and Step S93 constitute region display control portion.

The above flowchart does not limit the present invention to a procedure shown in the above flow but is capable of addition, deletion or change of order and the like of the procedure in a range not departing from the gist and technical idea of the invention.

FIG. 16A is a diagram illustrating an example of the field of view FV when the search target finding information is visualized and displayed by the display device 120 at Step S60, and FIG. 16B is a diagram illustrating an example of the field of view FV when the communication region information is visualized and displayed after the directivity is changed variably by the display device 120 at Step S93.

FIG. 16A is similar to the above-mentioned FIG. 12A, and the RFID tag T provided at the multifunction laser beam printer LP to be searched is present in the communication region S visualized and displayed substantially at the center part of the field of view FV, and the information of the RFID tag T is received through the antenna 110 via radio communication and the finding information B is visualized and displayed.

FIG. 16B is a state after the position or attitude of the entire apparatus 100 for searching a RFID tag is changed from the state in FIG. 16A due to movement of the face of the operator M and the like and the field of view FV is moved to a predetermined direction (right direction in FIG. 16). At this time, the multifunction laser beam printer LP to be searched has been moved on the outer circumference side in the field of view FV, but since the directivity is made variable, the communication region S also follows the movement of the multifunction laser beam printer LP and is visualized and displayed at a position similar to that of the multifunction laser beam printer LP. As a result, radio communication with the RFID tag T is maintained, and the finding information B is continued to be visualized and displayed.

In the variation described above, the direction of the directivity of the antenna 110A is variably controlled by the control circuit 133. As a result, the communication region S from the antenna 110A can be moved with the change of the direction of the directivity. Then, on the basis of the control of the control circuit 133, the moving communication region S is visualized and displayed in the field of view FV of the display device 120, and the operator M can search the RFID tag T while visually recognizing the moving communication region S.

Also, particularly in this variation, after the detection of the RFID tag T relating to the search target LP, even if the position or attitude of the display device 120 or the entire apparatus 100 for searching a RFID tag is changed and the direction is changed, the direction of the directivity can be controlled in the location direction of the RFID tag T in a form that the change (displacement) of the direction is corrected. As a result, communication with the RFID tag T can be surely maintained. Also, by keeping on outputting an electric wave, whether the RFID tag T is truly present in the direction can be surely detected.

(4) When the Directivity is Made Variable Before the Search Target is Found:

In the above variation (3), the directivity is fixed till the search target is found, and the directivity is variably controlled after the finding so that the communication region follows the search target, but the directivity may be changed variably during a period till the search target is found. This variation is an example of such a control.

Since the configuration of the apparatus 100 for searching a RFID tag of this variation is similar to that shown in the above-mentioned FIG. 13, the description will be omitted.

FIG. 17 is a flowchart illustrating a control procedure executed by the control circuit 133 of the apparatus 100 for searching a RFID tag of this variation and corresponds to the above-mentioned FIG. 11 and the like. The same reference numerals are given to the procedures similar to those in FIG. 11 and the like and the description will be omitted as appropriate.

First, at Step S10, the control circuit 133 gets the search target information transmitted from the terminal 300.

At the subsequent Step S100, the control circuit 133 executes search processing for searching the RFID tag T of the search target LP while changing the directivity of the antenna 110A by the phased-array antenna control.

At the subsequent Step S60, the control circuit 133 outputs a display signal to the display control portion 121 of the display device 120 so as to visualize and display the finding information that the search target is found in the field of view FV of the display device 120 (See FIG. 19A, which will be described later).

At the subsequent Step S65, the control circuit 133 stops transmission of the read-out signal by transmitting a control signal to the transmitting portion 142 of the radio frequency circuit 131 so as to stop radio communication with the RFID tag T.

The subsequent Step S70 to Step S90 are similar to the above-mentioned FIG. 11 and the like, and the control circuit 133 gets the azimuth information at receiving from the electronic compass 135 and stores it in the storage portion 134 and gets the subsequent relative azimuth information from the electronic compass 135 and stores it in the storage portion 134. Then, the azimuth information at receiving and the relative azimuth information are read out of the storage portion 134 and their difference is calculated so as to determine if there is a difference between the azimuths or not. If there is no difference in the azimuth, this flow is finished. On the other hand, if there is a difference between the azimuths, the routine goes to Step S96.

At Step S96, the control circuit 133 outputs a display signal to the display control portion 121 of the display device 120 on the basis of the azimuth difference calculated at Step S90. As a result, in the field of view FV of the display device 120, the moved communication region S is visualized and displayed in the form that the azimuth difference is corrected (See FIG. 19B, which will be described later).

The above flowchart does not limit the present invention to a procedure shown in the above flow but is capable of addition, deletion or change of order and the like of the procedure in a range not departing from the gist and technical idea of the invention.

FIG. 18 is a flowchart illustrating a detailed procedure of the search processing of Step S100.

First, at Step S101, the control circuit 133 reads out and gets azimuth initial setting information from the storage portion 134. The azimuth initial setting information is information for setting an initial angle at start of the phased-array antenna control.

At the subsequent Step S102, at start of the phased-array antenna control, the control circuit 133 sets an initial value of a main lobe direction angle θ indicating its main lobe direction to θa on the basis of the azimuth initial setting information obtained at Step S101.

Subsequently, at Step S103, the control circuit 133 determines the phases relating to the receiving antennas 112A, 112B, 112C, 112D; 112E, 112F, 112G, and 112H according to the value of the main lobe direction angle θ and outputs phase control signals corresponding to the determined phases to the phase control units 103A, 103B, 103C, 103D, 103E, 103F, and 103G.

Subsequently, at Step S104, the control circuit 133 outputs a read-out signal (inquiry signal) to the RFID tag T of the search target LP from the transmission antenna 111 under the condition that sets the phases of the receiving antennas 112A to 112H (in other words, the main lobe direction angle θ is set) as above.

At the subsequent Step S105 and Step S106, the control circuit 133 gets the communication region information (directivity information and transmission power information on the basis of the directivity variable control) and outputs a display signal to the display control portion 121 of the display device 120 on the basis of the obtained communication region information, and has the communication region S be visualized and displayed in the field of view FV of the display device 120. Here, Step S106 and Step S96 above described constitute region display control portion. Further, Steps S101-S105, Step S107, Step 108, Step S110 and Step S65 constitute directivity control portion.

Subsequently, at Step S107, the control circuit 133 receives the response signal transmitted from the RFID circuit element To of the RFID tag T of the search target LP corresponding to the read-out signal from the receiving antennas 112A to 112H, controls the phase at the phase control units 103A to 103H and takes it in through the adder 105 and the receiving portion 143.

Then, at Step S108, the control circuit 133 determines if the obtained tag ID matches the tag ID of the search target or not on the basis of the response signal received as above. If not matched, only θSTEP determined in advance is added at Step S110 and the routine returns to Step S103, where the similar procedure is repeated.

By repeating Step S103 to Step S110 as above, θSTEP is added to the value of θ in a small increment so that the main lobe direction angle θ is gradually changed while the direction of the main lobe (directivity) generated by all the receiving antennas 112A to 112H is held to a single direction. At this time, according to the change of the main lobe, the communication region S is visualized and displayed in the field of view FV of the display device 120. Then, if the obtained tag ID matches the tag ID of the search target, the determination at Step S108 is satisfied, and this routine is finished.

The above flowchart does not limit the present invention to a procedure shown in the above flow but is capable of addition, deletion or change of order and the like of the procedure in a range not departing from the gist and technical idea of the invention.

FIG. 19A is a diagram illustrating an example of the field of view FV when the search target LP is searched while the directivity is changed variably and the search target discovery information is visualized and displayed by the display device 120 at Step S60, and FIG. 19B is a diagram illustrating an example of the field of view FV when the communication region information after movement is visualized and displayed by the display device 120 at Step S96.

FIG. 19A is similar to the above-mentioned FIG. 12A and the like, and the RFID tag T provided at the multifunction laser beam printer LP to be searched is present in the communication region S visualized and displayed substantially at the center part of the field of view FV, and the information of the RFID tag T is received through the antenna 110 via radio communication and the finding information B is visualized and displayed.

FIG. 19B is a state after the position or attitude of the entire apparatus 100 for searching a RFID tag is changed from the state in FIG. 19A due to movement of the face of the operator M and the like and the field of view FV is moved to a predetermined direction (right direction in FIG. 19). At this time, the multifunction laser beam printer LP to be searched has been moved on the outer circumference side in the field of view FV, but since the communication region S follows the movement of the multifunction laser beam printer LP and is visualized and displayed at a position similar to the multifunction laser beam printer LP. Since the radio communication with the RFID tag T has been stopped in this variation, the finding information B is not visualized or displayed.

In the above-described variation, by stopping the subsequent radio communication if there is a response from the RFID tag T of the search target LP, useless communication is prevented, and power consumption of the apparatus 100 for searching a RFID tag can be saved. Also, by storing the position at the response, the location information of the RFID tag T can be notified to the operator M even after the communication is finished.

Also, particularly in this variation, according to the difference between the azimuth at receiving and the relative azimuth, the communication region S is moved and visualized and displayed in the field of view FV of the display device 120. As a result, after the response of the RFID tag T is once successfully received and the radio communication is stopped, even if the direction of the display device 120 or the entire apparatus 100 for searching a RFID tag is changed, the continued display can be made in the form that the communication region S is moved so as to correct the change (in other words, the original communication region S is locked on and continued to be captured). As a result, the location information of the RFID tag T relating to the search target LP can be surely notified to the operator M.

(5) Others

In the above, if the directivity is changed variably, the communication region S visualized and displayed in the field of view FV of the display device 120 is moved with the change of the direction of directivity, but not limited to that, the entire communication region that can be covered by the change of the directivity may be visualized and displayed.

For example, FIG. 20 is a diagram illustrating an example of the field of view FV when the directivity of the antenna 110A is changed in the right and left direction by a predetermined angle (angle in a range contained in the field of view FV). As shown in the figure, in this variation, the entire communication region So that can be covered by the change of the directivity is visualized and displayed in the field of view FV of the display device 120. As a result, the operator M can search the RFID tag T while visually recognizing the entire communication region So overlapped with the moving communication region S.

Also, in the above, if the directivity is made variable the directivity is made variable using electronic control (phased-array antenna control), but not limited to that, the directivity may be made variable physically by driving the antenna 110.

Also, in the above, if the directivity is made variable, the directivity is moved automatically, but not limited to that, it may be so configured that directivity direction operating means is provided at the apparatus 100 for searching a RFID tag so that the operator M can change the directivity of the antenna 110 manually in an arbitrary direction. As a result, if articles are arranged side by side at a high place, for example, the directivity can be directed to that direction, which facilitates the search operation and improves convenience of the operator M. An example of the directivity direction operating means is a laser pointer and the like, for example. In this case, light output from the laser pointer may be detected by image analysis and the like so that the directivity is variably controlled in that direction. By using the laser pointer in this way, an effect that the position of the RFID tag T to be searched can be known easily to the operator and the others can be expected.

Also, in the above, the antenna 110 is fixedly provided at the display device 120 so that the directivity of the antenna 110 is in the same direction as that of the display device 120, and by getting the communication region information made of the directivity information and the transmission power information of the antenna 110, the communication region S is visualized and displayed in the field of view FV, but not limited to that. That is, if the antenna 110 and the display device 120 are provided separately, the respective azimuths are detected by the electronic compass 135 (azimuth detecting device) and the communication region S is visualized and displayed in the field of view FV on the basis of these pieces of azimuth information.

Also, in the above, the retinal scanning display is used as the display device 120, but other display devices may be used as long as it is a so-called wearable transparent display that can be worn on the body of the operator M.

FIG. 21 is a diagram conceptually illustrating a configuration of a reflective head-mount display, which is an example of the other display devices.

A display device 180 of this variation has an image display portion 181 that displays a created image, a half mirror 182 having a nature that transmits a visible ray and reflects a specific wavelength or band ray, and a housing 183 provided with the image display portion 181 and the half mirror 182. In this display device 180, the operator M can see the natural image of an article in the field of view FV by having it transmit through the half mirror 182 and since the created image displayed by the image display portion 181 on the basis of the control of the control circuit 133 (communication region S and the like) is reflected by the half mirror 182 to the side of the operator M, the image can be seen overlapping the natural image of the article in the field of view FV. By using the display device 180 with such configuration, too, the effect similar to the above embodiments can be obtained.

Also, other than the above described, methods by the above embodiments and each variation may be combined as appropriate for use.

Though not individually exemplified, the present invention is put into practice with various changes in a range not departing from its gist.

What is claimed is:

1. An apparatus for searching an RFID tag comprising:
an antenna device provided with a predetermined directivity for carrying out radio communication with a specific RFID tag provided at a search target selected among a plurality of search targets;
a transparent display device configured to be able to impart a predetermined field of view including a natural image of said specific search target to vision of an operator and held at a head portion of said operator;
a region information acquisition portion configured to get communication region information including directivity information relating to directivity of said antenna device and transmission power information relating to transmission power of a signal output through said antenna device, corresponding to a communication region generated along said directivity from said antenna device;
a display position determining portion configured to determine a display position of said communication region visualized and displayed in said predetermined field of view on the basis of said directivity information acquired by said region information acquisition portion;
a display size determining portion configured to determine a display size of said communication region visualized and displayed in said predetermined field of view on the basis of said transmission power information acquired by said region information acquisition portion;
a region display control portion configured to generate a display signal for visualization display of said communication region in said predetermined field of view of said display device, by means of the display position for the visualization display determined by said display position determining portion and the display size for the visualization display determined by said display size determining portion, and to output the signal to said display device;
a target information acquisition portion configured to get search target information relating to said search target;
a target display control portion configured to generate a display signal for visualization display of said search target information acquired by said target information acquisition portion in said predetermined field of view and to output the signal to said display device;
a transmission processing device configured to generate an inquiry signal to said RFID tag relating to said search target and to transmit the signal to said RFID tag present in said communication region through said antenna device;
a receiving processing device capable of receiving a response signal transmitted from said RFID tag in response to said inquiry signal through said antenna device;
a receiving display control portion configured to generate a display signal for making the corresponding display in said predetermined field of view when said response signal from said RFID tag in response to said inquiry signal is received by said receiving processing device and to output the signal to said display device;
an azimuth detecting device configured to detect a relative azimuth of said display device with respect to a reference article; and
an azimuth storage device configured to store said relative azimuth detected by said azimuth detecting device as a receiving azimuth when said response signal from said RFID tag in response to said inquiry signal is received by said receiving processing device.

2. An apparatus for searching an RFID tag comprising:
an antenna device provided with a predetermined directivity for carrying out radio communication with a specific RFID tag provided at a search target selected among a plurality of search targets;
a transparent display device configured to be able to impart a predetermined field of view including a natural image of said specific search target to vision of an operator and held at a head portion of said operator;
a storage portion configured to store communication region information including directivity information relating to directivity of said antenna device, that is initially fixedly set along a direction same as a direction of said display device and transmission power information relating to transmission power of a signal output through antenna device, corresponding to a communication region generated along said directivity from said antenna device;
a region information acquisition portion configured to acquire said communication region information from said storage portion;
a display position determining portion configured to determine a display position of said communication region visualized and displayed in said predetermined field of view on the basis of said directivity information included in said communication region information acquired by said region information acquisition portion;
a display size determining portion configured to determine a display size of said communication region visualized and displayed in said predetermined field of view on the basis of said transmission power information included in said communication region information acquired by said region information acquisition portion;
a region display control portion configured to generate a display signal for visualization display of said communication region in said predetermined field of view of said display device, by means of the display position for the visualization display determined by said display position determining portion and the display size for the visualization display determined by said display size determining portion, and to output the signal to said display device;
a target information acquisition portion configured to get search target information relating to said search target;
a target display control portion configured to generate a display signal for visualization display of said search target information acquired by said target information acquisition portion in said predetermined field of view and to output the signal to said display device;
a transmission processing device configured to generate an inquiry signal to said RFID tag relating to said search target and to transmit the signal to said RFID tag present in said communication region through said antenna device;
a receiving processing device capable of receiving a response signal transmitted from said RFID tag in response to said inquiry signal through said antenna device;
a receiving display control portion configured to generate a display signal for making the corresponding display in said predetermined field of view when said response signal from said RFID tag in response to said inquiry signal is received by said receiving processing device and to output the signal to said display device;
an azimuth detecting device configured to detect a relative azimuth of said display device with respect to a reference article; and an azimuth storage device configured to store said relative azimuth detected by said azimuth detecting device as a receiving azimuth when said response signal from said RFID tag in response to said inquiry signal is received by said receiving processing device.

3. An apparatus for searching an RFID tag comprising:
an antenna device provided with a predetermined directivity for carrying out radio communication with a specific RFID tag provided at a search target selected among a plurality of search targets;
a transparent display device configured to be able to impart a predetermined field of view including a natural image of said specific search target to vision of an operator and held at a head portion of said operator;
a region information acquisition portion configured to get communication region information including directivity information relating to directivity of said antenna device and transmission power information relating to transmission power of a signal output through said antenna device, corresponding to a communication region generated along said directivity from said antenna device;
a display position determining portion configured to determine a display position of said communication region visualized and displayed in said predetermined field of view on the basis of said directivity information acquired by said region information acquisition portion;
a display size determining portion configured to determine a display size of said communication region visualized and displayed in said predetermined field of view on the basis of said transmission power information acquired by said region information acquisition portion;
a region display control portion configured to generate a display signal for visualization display of said communication region in said predetermined field of view of said display device, by means of the display position for the visualization display determined by said display position determining portion and the display size for the visualization display determined by said display size determining portion, and to output the signal to said display device;
a target information acquisition portion configured to get search target information relating to said search target;
a target display control portion configured to generate a display signal for visualization display of said search target information acquired by said target information acquisition portion in said predetermined field of view and to output the signal to said display device;
a transmission processing device configured to generate an inquiry signal to said RFID tag relating to said search target and to transmit the signal to said RFID tag present in said communication region through said antenna device;
a receiving processing device capable of receiving a response signal transmitted from said RFID tag in response to said inquiry signal through said antenna device;
a receiving display control portion configured to generate a display signal for making the corresponding display in said predetermined field of view when said response signal from said RFID tag in response to said inquiry signal is received by said receiving processing device and to output the signal to said display device;
an azimuth detecting device configured to detect a relative azimuth of said display device with respect to a reference article;
an azimuth storage device configured to store said relative azimuth detected by said azimuth detecting device as a receiving azimuth when said response signal from said RFID tag in response to said inquiry signal is received by said receiving processing device;
a direction display control portion configured to generate a display signal for making a display corresponding to location information of said RFID tag in said predetermined field of view according to a difference between said receiving azimuth stored in said azimuth storage device and said relative azimuth of said display device detected by said azimuth detecting device and to output the signal to said display device; and
a directivity control portion configured to variably control a direction of said directivity of said antenna device, wherein:
said region display control portion generates said display signal for visualization display of said communication region moving with change in the direction of the directivity by said directivity control portion and to output the signal to said display device.

4. An apparatus for searching an RFID tag comprising:
an antenna device provided with a predetermined directivity for carrying out radio communication with a specific RFID tag provided at a search target selected among a plurality of search targets;
a transparent display device configured to be able to impart a predetermined field of view including a natural image of said specific search target to vision of an operator and held at a head portion of said operator;
a storage portion configured to store communication region information including directivity information relating to directivity of said antenna device, that is initially fixedly set along a direction same as a direction of said display device and transmission power information relating to transmission power of a signal output through antenna device, corresponding to a communication region generated along said directivity from said antenna device;
a region information acquisition portion configured to acquire said communication region information from said storage portion;
a display position determining portion configured to determine a display position of said communication region visualized and displayed in said predetermined field of view on the basis of said directivity information included in said communication region information acquired by said region information acquisition portion;
a display size determining portion configured to determine a display size of said communication region visualized and displayed in said predetermined field of view on the basis of said transmission power information included in said communication region information acquired by said region information acquisition portion;
a region display control portion configured to generate a display signal for visualization display of said communication region in said predetermined field of view of said display device, by means of the display position for the visualization display determined by said display position determining portion and the display size for the visualization display determined by said display size determining portion, and to output the signal to said display device;
a target information acquisition portion configured to get search target information relating to said search target;
a target display control portion configured to generate a display signal for visualization display of said search target information acquired by said target information acquisition portion in said predetermined field of view and to output the signal to said display device;

a transmission processing device configured to generate an inquiry signal to said RFID tag relating to said search target and to transmit the signal to said RFID tag present in said communication region through said antenna device;

a receiving processing device capable of receiving a response signal transmitted from said RFID tag in response to said inquiry signal through said antenna device;

a receiving display control portion configured to generate a display signal for making the corresponding display in said predetermined field of view when said response signal from said RFID tag in response to said inquiry signal is received by said receiving processing device and to output the signal to said display device;

an azimuth detecting device configured to detect a relative azimuth of said display device with respect to a reference article;

an azimuth storage device configured to store said relative azimuth detected by said azimuth detecting device as a receiving azimuth when said response signal from said RFID tag in response to said inquiry signal is received by said receiving processing device;

a direction display control portion configured to generate a display signal for making a display corresponding to location information of said RFID tag in said predetermined field of view according to a difference between said receiving azimuth stored in said azimuth storage device and said relative azimuth of said display device detected by said azimuth detecting device and to output the signal to said display device; and a directivity control portion configured to variably control a direction of said directivity of said antenna device, wherein:

said region display control portion generates said display signal for visualization display of said communication region moving with change in the direction of the directivity by said directivity control portion and to output the signal to said display device.

* * * * *